US012091893B2

(12) United States Patent
Forrest

(10) Patent No.: US 12,091,893 B2
(45) Date of Patent: Sep. 17, 2024

(54) RETRACTABLE SECURITY LATCH WITH STRIKER

(71) Applicant: ATECH AVIATION CONSULTING, LLC, Cedar Park, TX (US)

(72) Inventor: Andre Glenn Forrest, Cedar Park, TX (US)

(73) Assignee: ATECH AVIATION CONSULTING, LLC, Cedar Park, TX (US)

(*) Notice: Subject to any disclaimer, the term of this patent is extended or adjusted under 35 U.S.C. 154(b) by 0 days.

(21) Appl. No.: 17/662,273

(22) Filed: May 6, 2022

(65) Prior Publication Data

US 2022/0356738 A1 Nov. 10, 2022

Related U.S. Application Data

(60) Provisional application No. 63/185,690, filed on May 7, 2021.

(51) Int. Cl.
*E05C 3/14* (2006.01)
*E05B 65/00* (2006.01)
(Continued)

(52) U.S. Cl.
CPC ................ *E05C 3/14* (2013.01); *E05C 3/008* (2013.01); *E05C 21/00* (2013.01); *E05B 65/0014* (2013.01); *E05B 65/44* (2013.01)

(58) Field of Classification Search
CPC ......... Y10T 292/0951; Y10T 292/0911; Y10T 292/096; Y10T 292/0934; Y10T 292/0952;
(Continued)

(56) References Cited

U.S. PATENT DOCUMENTS

| | | | | |
|---|---|---|---|---|
| 516,546 A * | 3/1894 | McCauley | E05D 11/082 | 16/338 |
| 618,895 A * | 2/1899 | Munday | E05C 19/06 | 24/615 |

(Continued)

FOREIGN PATENT DOCUMENTS

| | | | | |
|---|---|---|---|---|
| BR | 8205440 A * | 8/1983 | E05D 5/128 |
| CN | 202152579 U | 2/2012 | |

(Continued)

OTHER PUBLICATIONS

Espacenet machine translation WO 2018146416 A1 published Aug. 16, 2018 (Year: 2023).*

(Continued)

*Primary Examiner* — Kristina R Fulton
*Assistant Examiner* — Steven A Tullia
(74) *Attorney, Agent, or Firm* — Thompson Patent Law Offices PC

(57) ABSTRACT

Apparatus and associated methods relate to a selectively operated safety latch having an active mode and a stowed mode. In an illustrative example, a retractable safety latch may include a tongue element extending in a first plane and a base element extending in a second plane. The tongue element, for example, may include multiple mode selection slots. The base element may include a brace slot. For example, one of the multiple mode selection slots and the brace slot may receive a security pin long a longitudinal axis so that a predetermined mode is selected. In the active mode, the tongue element extends away from the base element to releasably engage a striker element. In the inactive mode, the first plane and the second plane are substantially parallel such that the tongue element is prevented from engaging the striker element. Various embodiments may advantageously provide quick switching security latch operations.

22 Claims, 34 Drawing Sheets

(51) Int. Cl.
*E05B 65/44* (2006.01)
*E05C 3/00* (2006.01)
*E05C 21/00* (2006.01)

(58) Field of Classification Search
CPC ......... Y10T 292/0957; Y10T 292/1051; Y10T 292/1061; Y10T 292/1083; Y10T 292/1084; Y10T 292/1091; E05C 3/14; E05C 3/008; E05C 3/00; E05C 3/006; E05C 3/12; E05C 3/124; E05C 3/30; E05C 21/00; E05B 65/0014; E05B 65/44; E05B 65/46; E05B 65/461; E05B 63/0056; E05B 63/0065; E05B 63/18; E05B 63/185; E05B 2063/0082; E05B 63/0008; A47B 88/50; A47B 88/57; Y10S 292/30; Y10S 292/38; Y10S 292/53; Y10S 292/60; Y10S 292/65; Y10S 292/17; E05D 11/10; E05D 11/1007; E05D 11/1014; E05D 11/1028; E05D 11/105; E05D 11/1078; E05D 2011/1092; E05D 5/128
USPC ........................... 16/263, 350, 351, 352, 353
See application file for complete search history.

(56) References Cited

U.S. PATENT DOCUMENTS 737,360 A * 8/1903 Daly ..................... E05D 7/1016 403/154
1,052,701 A * 2/1913 Watters ..................... E05D 3/02 16/263
1,155,953 A * 10/1915 Morrow .............. E05B 15/0093 292/108
1,646,580 A * 10/1927 Eastman ............... E05C 17/203 16/82
2,990,572 A * 7/1961 Schwartzberg ......... E05D 11/06 16/375
3,538,539 A * 11/1970 Allison ..................... E05D 5/14 16/375
3,877,739 A * 4/1975 Cowen ................ E05B 65/0811 292/DIG. 55
4,159,153 A * 6/1979 Yoshikawa .......... G07G 1/0027 312/333
4,416,477 A * 11/1983 Bialobrzeski ....... E05B 65/0014 292/87
4,605,353 A * 8/1986 Hahn ................... B65G 69/003 16/361
4,632,438 A * 12/1986 McKinney .......... E05B 65/0014 292/DIG. 60
4,717,184 A 1/1988 Boyce
5,035,451 A * 7/1991 Brady ..................... E05C 19/10 292/201
5,172,097 A * 12/1992 Arnold .................... E05B 67/38 70/DIG. 49
5,344,226 A * 9/1994 Lee ......................... E05B 65/46 312/334.47
5,445,451 A * 8/1995 Harmony ............... A47B 88/57 312/333
5,626,372 A 5/1997 Vogt
5,645,304 A 7/1997 Richardson et al.
5,711,053 A * 1/1998 Hafner .................... E05D 5/128 16/380
5,765,263 A * 6/1998 Bolinas ................. E05D 11/105 16/342
5,774,938 A * 7/1998 Kent ................... E05D 11/1007 16/332
5,887,317 A * 3/1999 Baker ................. E05D 11/1007 16/329
5,966,778 A * 10/1999 Ray ....................... E05D 11/082 16/338
6,079,754 A * 6/2000 Alexy ................... E04B 1/6183 292/202
6,092,264 A * 7/2000 Banks ..................... F42B 10/14 16/306
6,250,694 B1 * 6/2001 Weiland ................ E05C 19/022 292/121
6,942,257 B2 * 9/2005 Wong .................. E05B 65/0014 292/228
7,000,290 B1 * 2/2006 Ace ..................... E05D 11/1007 16/229
7,150,073 B2 * 12/2006 Stewart ............... E05D 11/1007 16/354
7,278,183 B2 * 10/2007 Schluter .................. E05D 5/121 16/262
7,686,353 B2 * 3/2010 Lewis ................... E05C 19/066 292/87
8,307,513 B1 * 11/2012 Fitzgerald ............... E05D 11/06 16/386
8,522,400 B1 * 9/2013 Jablonski ............ E05D 11/1007 16/326
8,732,906 B1 * 5/2014 Van Gennep ....... E05D 11/1007 16/229
9,068,382 B1 * 6/2015 Hall .......................... E05D 5/12
9,194,166 B1 * 11/2015 Spiegel ...................... E05D 3/02
9,909,035 B1 * 3/2018 Caldeira ................... B32B 5/18
10,208,510 B1 * 2/2019 Van Dyck ................. E05C 1/10
10,247,230 B2 * 4/2019 McCullough ........... F16C 11/10
10,837,202 B2 * 11/2020 Andersen ............ E05B 65/0014
11,053,722 B2 * 7/2021 Teta .......................... E05D 3/02
11,085,215 B1 * 8/2021 VanVolkinburg ....... E05D 11/02
2009/0133223 A1 * 5/2009 McAfee .............. E05D 11/1078 16/353
2011/0094058 A1 * 4/2011 Van Gennep ....... E05D 11/1007 16/327
2012/0205922 A1 * 8/2012 Choi ....................... E05C 17/08 292/270
2013/0219664 A1 * 8/2013 Burda ..................... E05D 11/06 16/374
2014/0173852 A1 * 6/2014 Heninger .................. E05D 5/14 16/375
2015/0132053 A1 * 5/2015 Kamada ................ F16B 21/088 403/375
2017/0022740 A1 * 1/2017 Hall .......................... E05D 5/12
2017/0211303 A9 * 7/2017 Stots ................... E05D 11/1007
2017/0275928 A1 9/2017 Kozlowski
2019/0032372 A1 * 1/2019 Andersen ................ E05B 65/46
2019/0234125 A1 8/2019 Sato

FOREIGN PATENT DOCUMENTS

CN 203515010 U * 4/2014 ............. E05B 47/00
DE 3637244 A1 * 11/1986 ........... E05D 7/1072
DE 202004003247 U1 * 6/2004 ......... E05D 11/1007
DE 10341145 A1 4/2005
DE 102013102319 A1 * 9/2014 ......... E05B 65/0014
EP 1293629 A2 3/2003
EP 1293629 A3 5/2005
EP 1927709 A2 * 6/2008 ........... E05B 17/142
FR 2943088 A1 9/2010
KR 100551094 B1 * 5/2009 ............. E05B 65/44
KR 20110105293 A * 3/2010 ............. E05D 11/00
WO WO-9516095 A1 * 6/1995 ........... E05B 47/004
WO 2005040530 A1 5/2005
WO WO-2011069001 A1 * 6/2011 ............. E05D 11/06
WO WO-2018146416 A1 * 8/2018 ............. E05C 17/52
WO 2019029792 A1 2/2019

OTHER PUBLICATIONS

International Search Report and Written Opinion of the International Searching Authority in related International Application No. PCT/US2022/072154, dated Nov. 4, 2022, 22 pages.
Invitation to Pay Additional Fees in related International Application No. PCT/US2022/072154, dated Jul. 19, 2022, 15 pages.
Written Opinion of the International Preliminary Examining Authority in related International Application No. PCT/US2022/072154, dated May 4, 2023, 19 pages.

(56) References Cited

OTHER PUBLICATIONS

International Preliminary Report on Patentability in related International Application No. PCT/US2022/072154, dated Aug. 14, 2023, 46 pages.
"Amazon.com: Safety 1st Adhesive Cabinet 4 Piece Latch for Childproofing, White: Baby." retrieved from the internet Mar. 28, 2022, <https://www.amazon.com/Safety-1st-Adhesive-Cabinet-Childproofing/dp/B07PZH65V3?th=1 >.

* cited by examiner

RETRACTABLE SECURITY LATCH WITH STRIKER

CROSS-REFERENCE TO RELATED APPLICATIONS

This application claims the benefit of U.S. Provisional Application Ser. No. 63/185,690, titled "Retractable Security Latch with Striker," filed by Andre Glenn Forrest, on May 7, 2021. This application incorporates the entire contents of the foregoing application(s) herein by reference.

TECHNICAL FIELD

Various embodiments relate generally to retractable security latches.

BACKGROUND

Security latches may be used, for example, to restrict access to storage compartments. For example, security latches may be used to prevent unwanted access to a cabinet or drawers. For example, parents may want to prevent their children from accessing a drawer (e.g., containing sharp objects) and/or a cabinet (e.g., containing toxic materials) using security latches.

SUMMARY

Apparatus and associated methods relate to a selectively operated folding safety latch having an active mode and a stowed mode. In an illustrative example, a retractable safety latch may include a tongue element extending in a first plane and a base element extending in a second plane. The tongue element, for example, may include multiple mode selection slots. The base element may include a brace slot. For example, one of the multiple mode selection slots and the brace slot may receive a security pin long a longitudinal axis so that a predetermined mode is selected. In the active mode, the tongue element extends away from the base element to releasably engage a striker element. In the inactive mode, the first plane and the second plane are substantially parallel such that the tongue element is prevented from engaging the striker element. Various embodiments may advantageously provide quick switching security latch operations.

Various embodiments may achieve one or more advantages. For example, some embodiments may include a cylindrical hook with a first radius (D1) configured to releasably coupled to a substantially cylindrical locking member with a second radius (D2) of the striker element, wherein D1<D2, to advantageously provide partially openings for ventilation. Some embodiments may, for example, include, a locking pin to advantageously strengthen the position of the tongue element. Some embodiments, for example, may provide multiple mounting mechanisms to conveniently attach the base element to a door. For example, some embodiments may include a wireless communication module configured to advantageously notify a predetermined device that the tongue element may be disengaged.

Various embodiments may advantageously provide security latches that reduces or eliminates inconvenience in accessing compartments when security is not needed. Sometimes, if a person forgets that security latches are activated, opening the latches forcefully may result in damage to a storage structure (e.g., a door, drawer, cabinetry, or other structure), injury and/or discomfort to a user, or some combination thereof. Damage to the security latch itself may, for example, render the latch inoperable. Accordingly, various embodiments may advantageously prevent discomfort and/or damage to latches, compartments, and/or users. In some cases, the damage may render the latch unusable on the storage structure.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, to help introduce discussion of various embodiments, an exemplary retractable security latch (RSL) is introduced with reference to FIGS. 1A-1D. Second, that introduction leads into a description with reference to FIG. 2A of some exemplary embodiments of the RSL. Third, with reference to FIGS. 11-20, various implementations and features are described in application to exemplary latch tongues and latch base. Fourth, with reference to FIGS. 21-26, the discussion turns to exemplary embodiments that illustrate an exemplary pintle-brace and security pin. Fifth, and with reference to FIG. 27-40, this document describes exemplary striker and strike plate implementation useful for the RSL. Sixth, the document introduces various operations characteristics of the RSL with reference to FIGS. 41-47. Finally, the document discusses further embodiments, exemplary applications and aspects relating to retractable security latch.

Figure 1A:
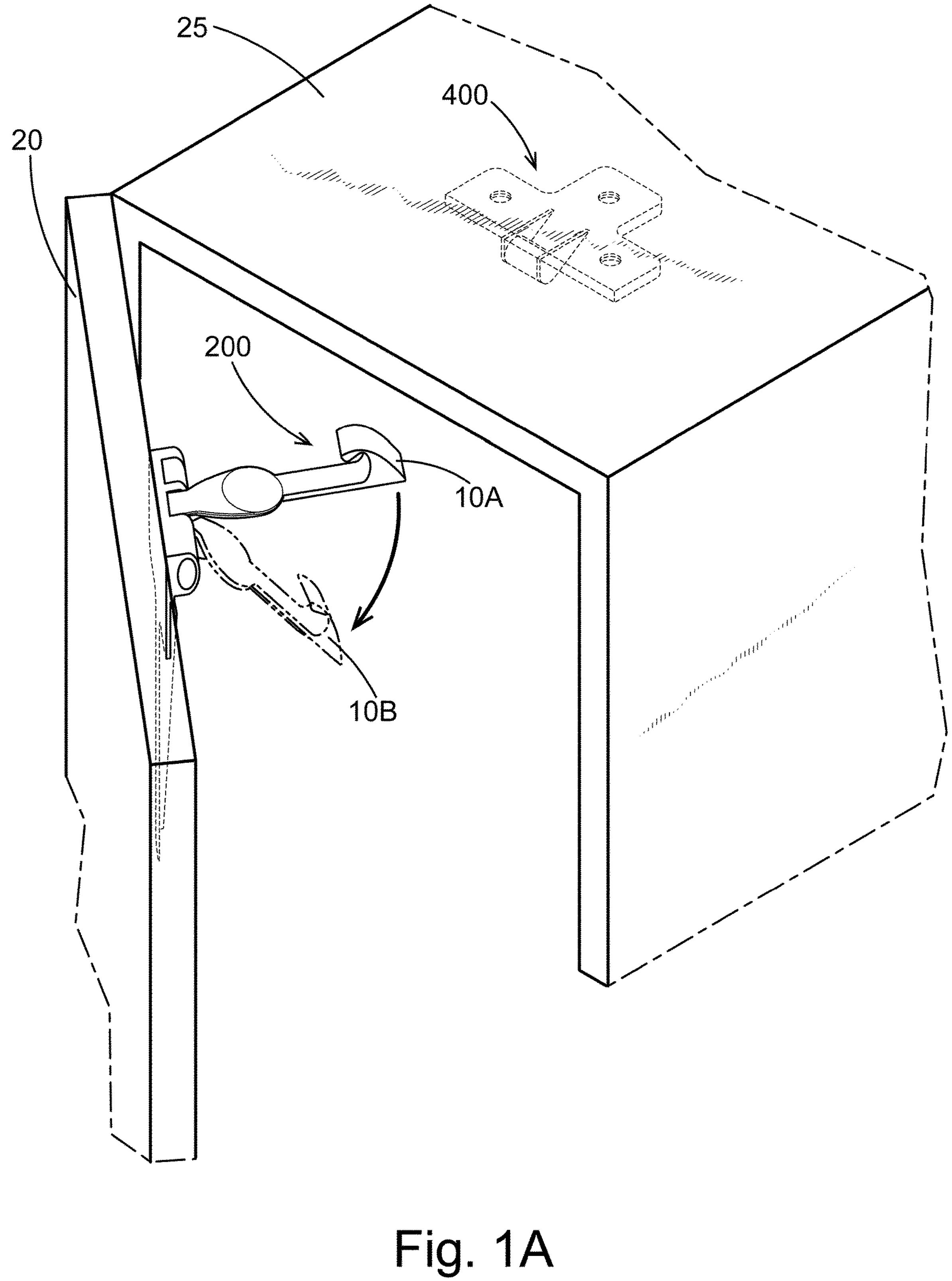
FIG. 1A depicts an exemplary retractable security latch (RSL) employed in an illustrative use-case scenario.
Figure 1B:
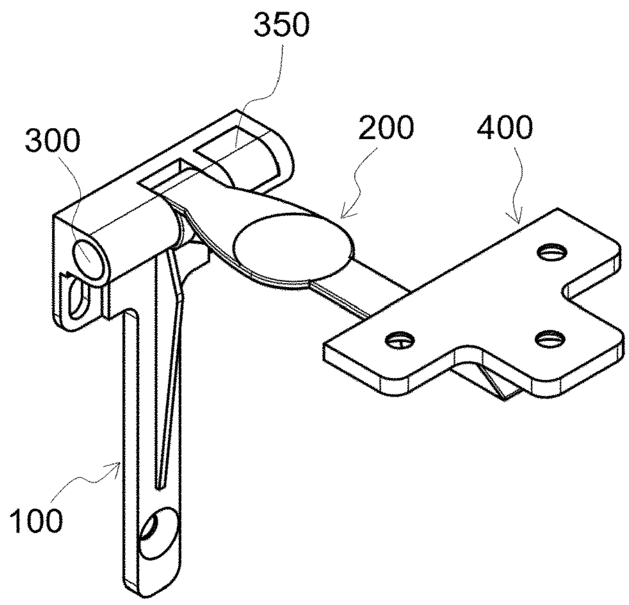
FIG. 1B, FIG. 1C, and FIG. 1D show isometric views of the exemplary RSL in the active position with an exemplary striker member.

FIG. 1A depicts an exemplary retractable security latch (RSL) employed in an illustrative use-case scenario. In this example, the RSL is installed at a cabinet having a cabinet door 20 and a compartment 25. The RSL includes a latch base (shown in FIG. 1B) and a latch tongue 200 mounted at the cabinet door 20. In an inactive position 10B, in some implementations, the latch tongue 200 may be relaxed substantially against the cabinet door 20. In an active position 10A, in some implementations, the latch tongue 200 may be positioned substantially perpendicular to the cabinet door 20. In the active position, the latch tongue 200 may catch a striker member 400 (as shown in FIG. 1B) mounted at the compartment 25 when the cabinet door 20 is closed. In some implementations, the latch tongue 200 and the striker member 400 may be releasably couple so that unwanted access (e.g., access by an infant) may be advantageously prevented.

Figure 1C:
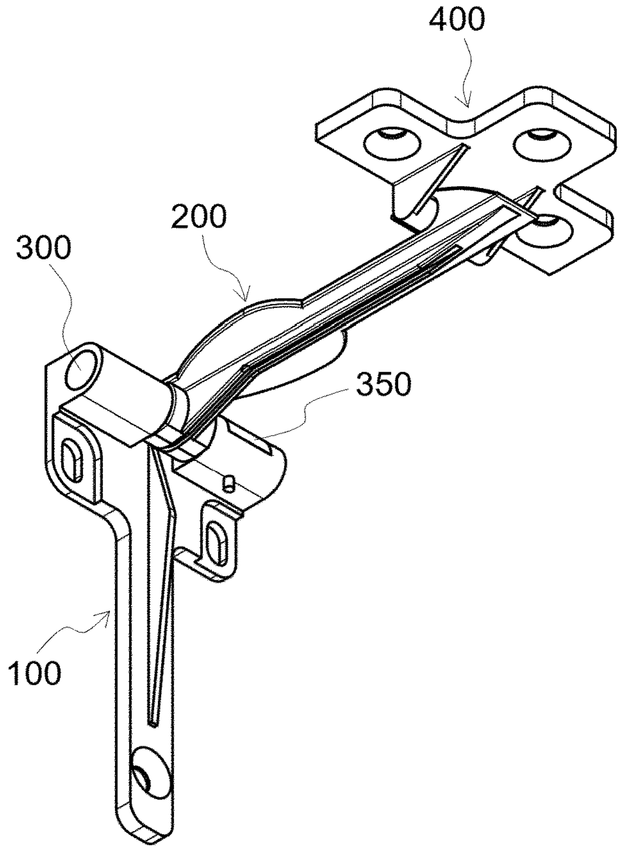
Figure 1D:
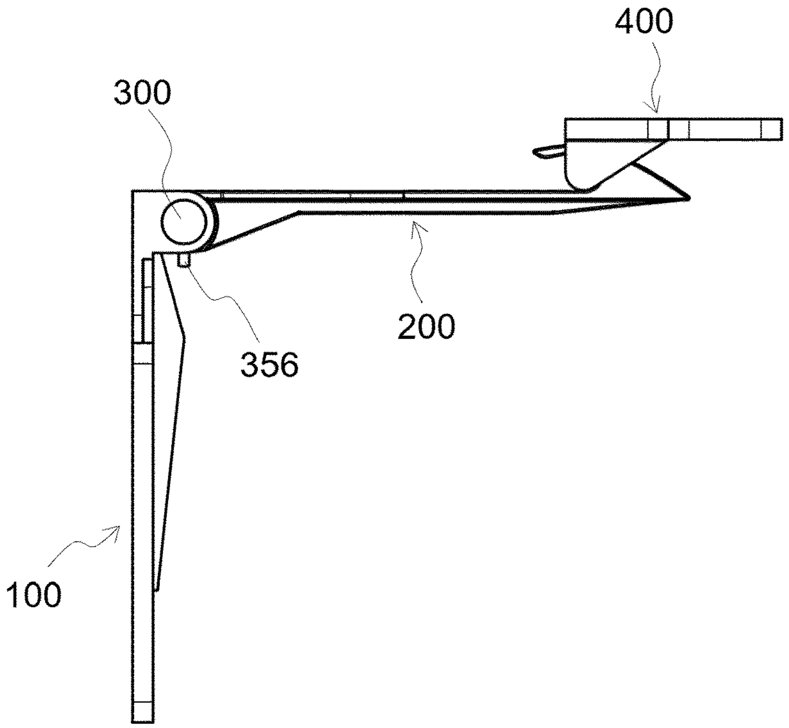

FIG. 1B and FIG. 1C show isometric views of the exemplary RSL 101 in the active position with an exemplary striker member 400. As shown in this illustrative example, the latch base 100 is coupled to the latch tongue 200 by a pintle-brace 300. The pintle-brace 300 in some implementations, may be inserted into a channel through the latch base 100 and the latch tongue 200. For example, the pintle-brace 300 may be made from a semicrystalline thermoplastic, a metal, or other material having sufficient material properties to provide the bracing function for the latch tongue 200. In this example, the pintle-brace 300 is fixed at position by a security pin 350. In various implementations, the security pin 350 may serve as a lock pin and, when fully inserted, prevents the pintle-brace 300 from inadvertently being displaced into a non-functioning position. The security pin 350 can be made from a semicrystalline thermoplastic, a metal, or other material having sufficient material properties to provide the securing function for the pintle-brace 300. As shown in FIG. 1D, the security pin 350 include a pin shaft 356. In some implementations, the pin shaft 356 may select an active mode and an inactive mode of the RSL. Further discussion of the pintle-brace 300 and the security pin 350 is described with reference to subsequent figures, e.g., FIG. 8.

Figure 2A:
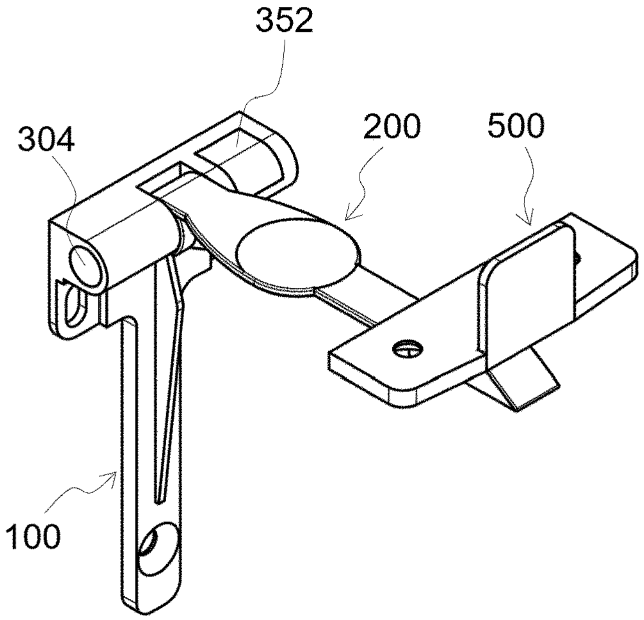
FIG. 2A, FIG. 2B, and FIG. 2C show isometric views of an exemplary security latch in an active position with the third striker embodiment.
Figure 2B:
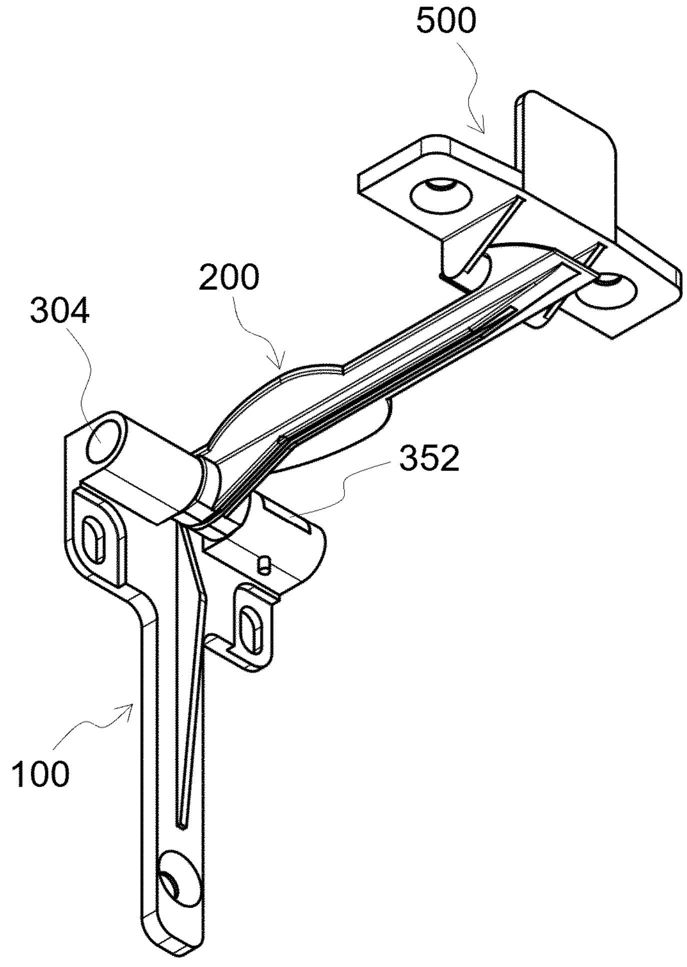
Figure 2C:
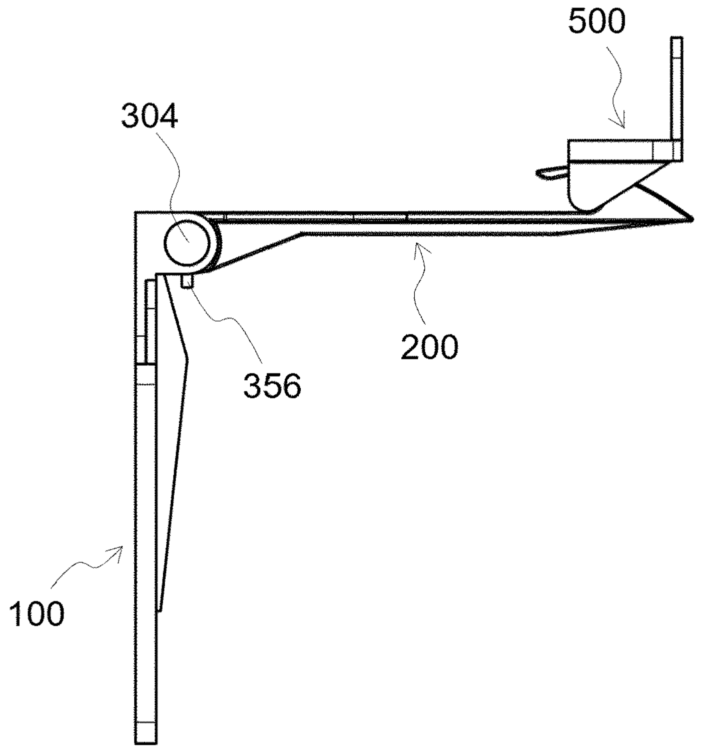

FIG. 2A, FIG. 2B, and FIG. 2C show isometric views of an exemplary security latch in the active position with the third striker embodiment. The security latch includes the latch base 100, the latch tongue 200, the pintle-brace 300, the security pin 350, and the striker, in this case a third striker embodiment 500. These figures introduce the basic components of the security latch with the third striker embodiment 500, which are further detailed in subsequent figures.

Figure 3A:
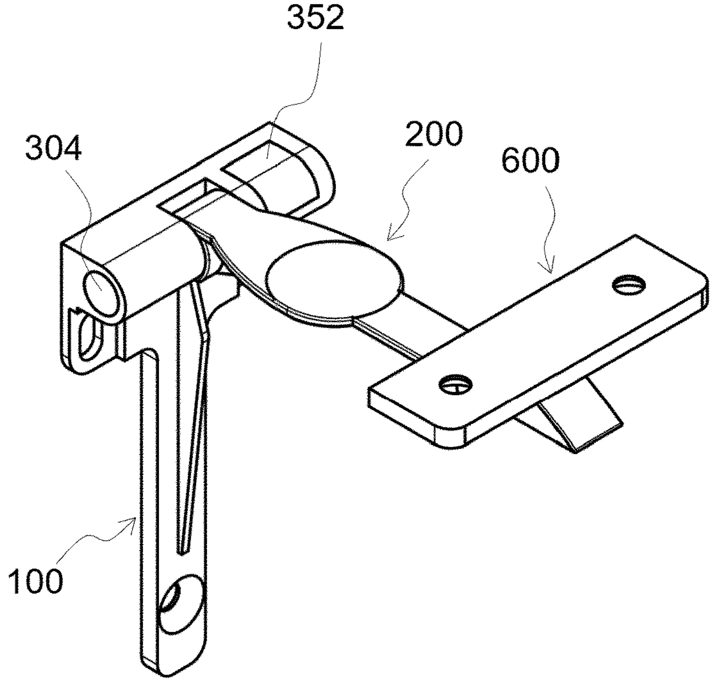
FIG. 3A, FIG. 3B, and FIG. 3C show isometric views of an exemplary security latch in the active position with the fifth striker embodiment.
Figure 3B:
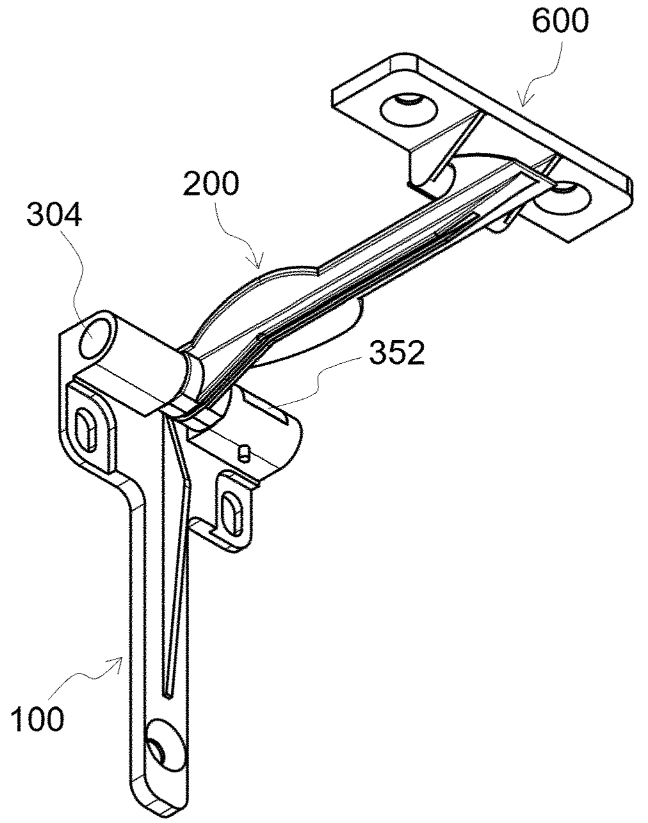
Figure 3C:
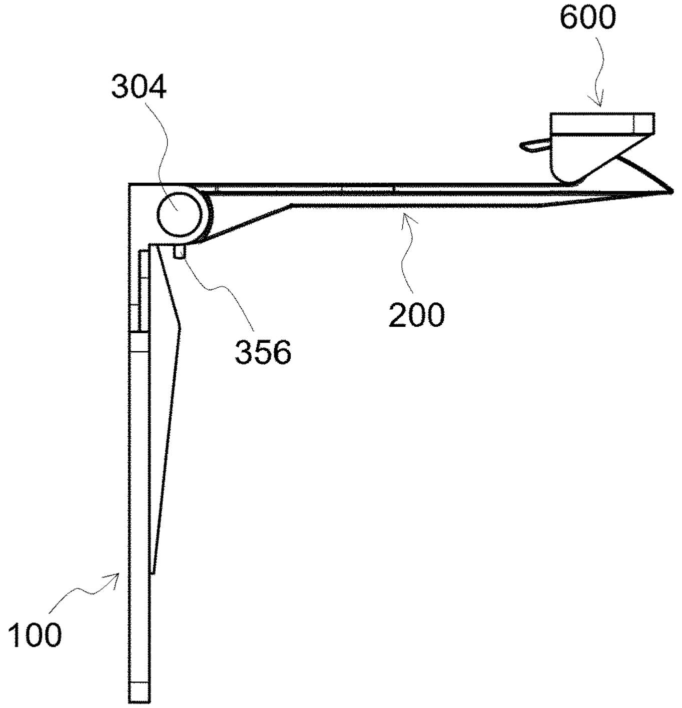

FIG. 3A to 3C show isometric views of an exemplary security latch in the active position with the fifth striker embodiment. The security latch includes the latch base 100, the latch tongue 200, the pintle-brace 300, the security pin 350, and the striker, in this case a fifth striker embodiment 600. These figures introduce the basic components of the security latch with the fifth striker embodiment 600, which are further detailed in subsequent figures.

Figure 4A:
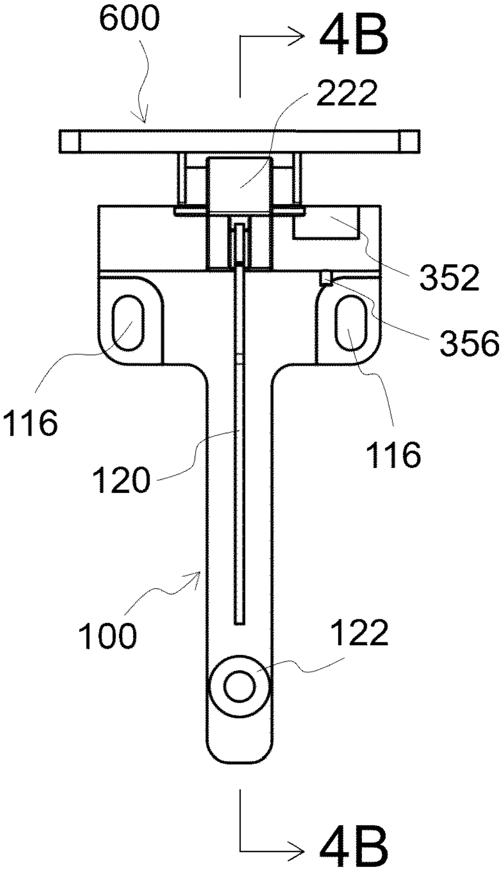
FIG. 4A and FIG. 4B show a front profile view and a sectional view of an exemplary security latch in the active position with the fifth striker embodiment.
Figure 4B:
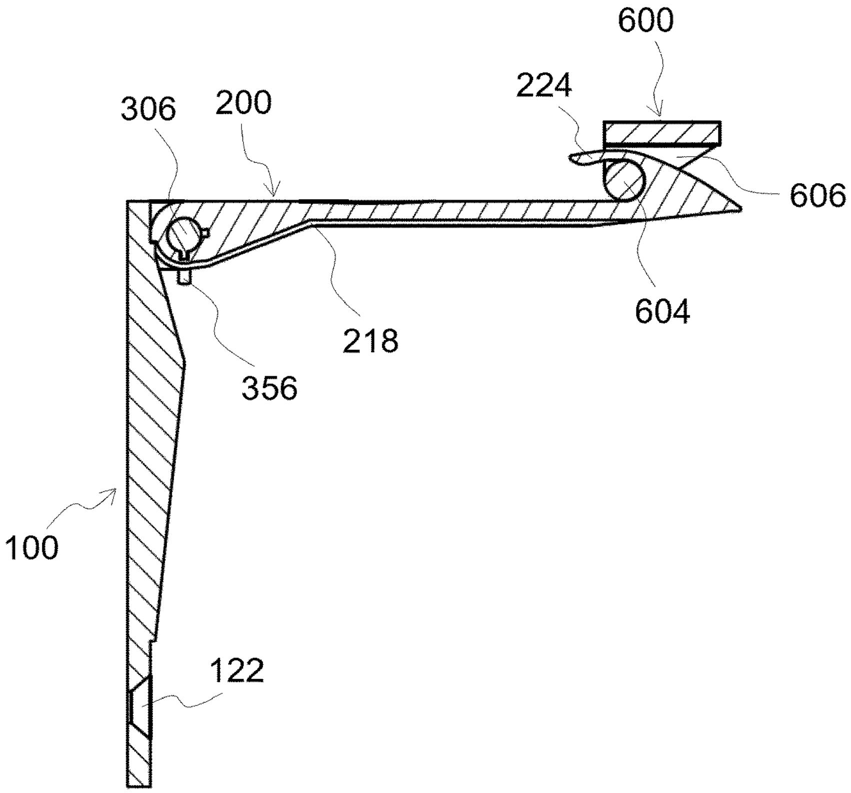

FIGS. 4A-4B show a front profile view and a sectional view of an exemplary security latch in the active position with the fifth striker embodiment. The security latch includes the latch base 100, the latch tongue 200, the pintle-brace 300, the security pin 350, and the striker, in this case the fifth striker embodiment 600. These figures introduce the basic components of the security latch with the fifth striker embodiment 600, which are further detailed in subsequent figures.

Figure 5:
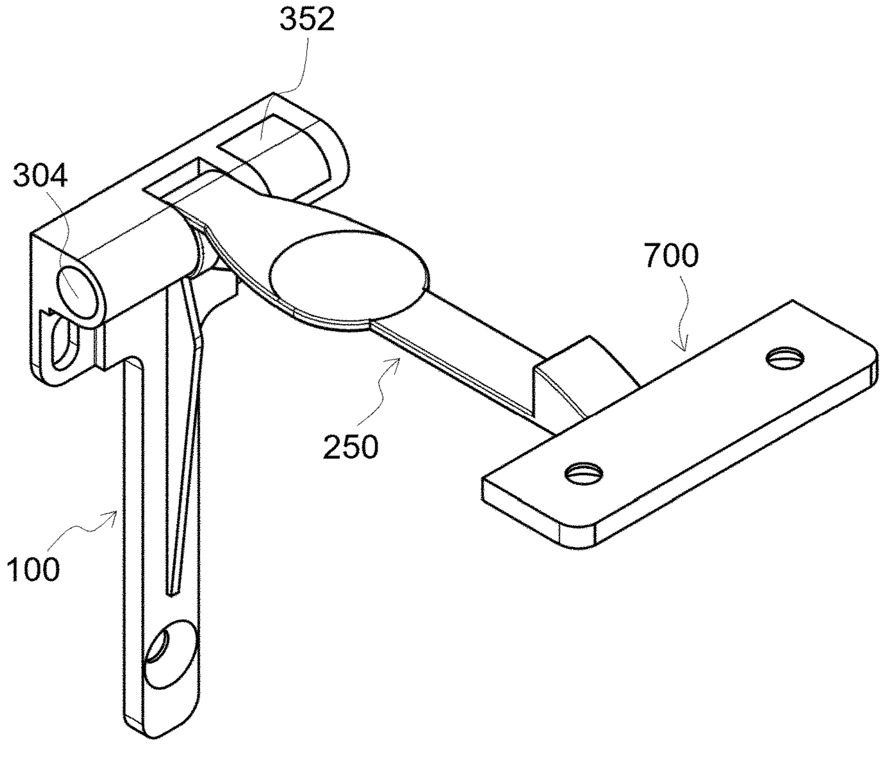
FIG. 5 and FIG. 6 show isometric views of a second embodiment of an exemplary security latch in the active position with the strike plate.
Figure 6:
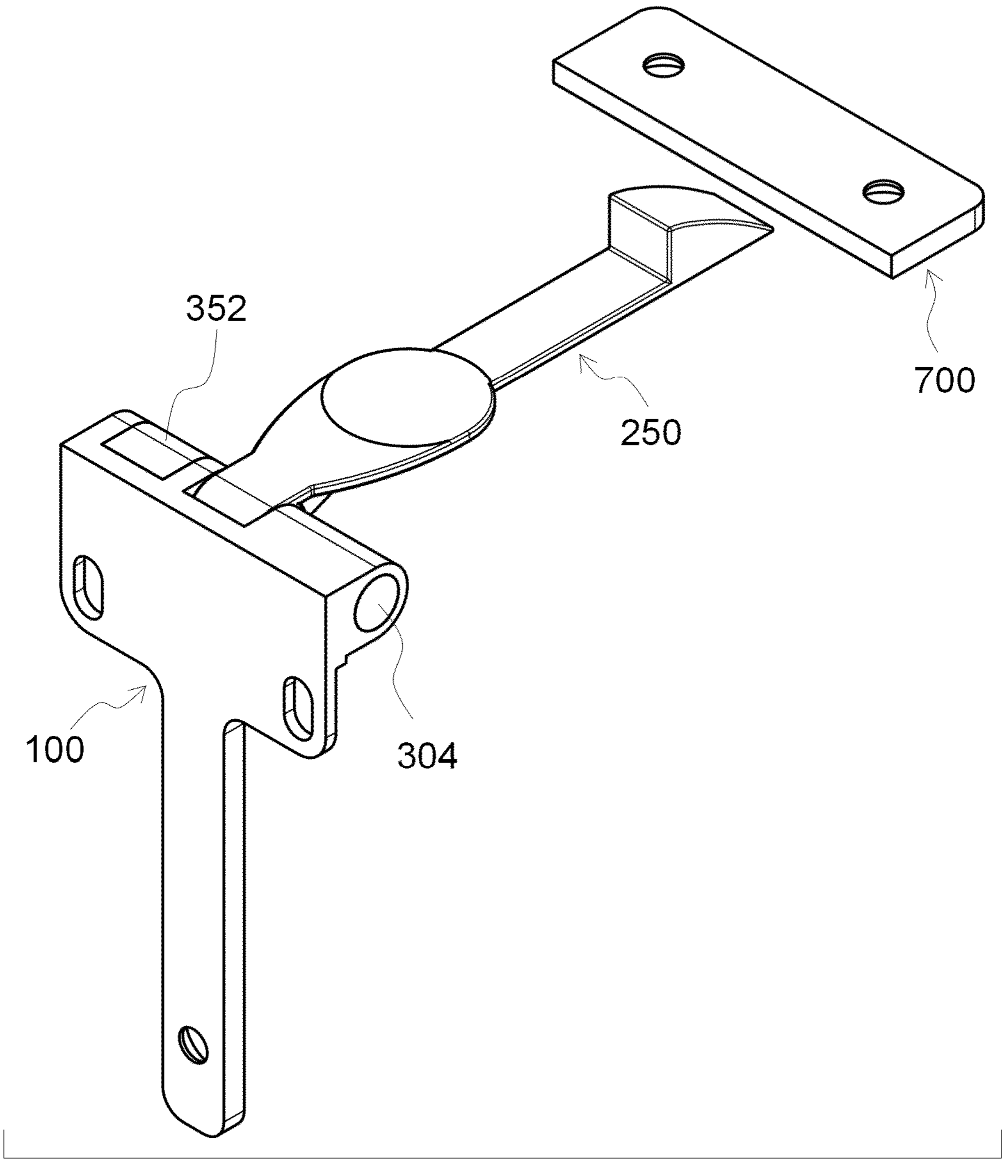

FIG. 5 and FIG. 6 show isometric views of a second embodiment of an exemplary security latch in the active position with the strike plate. The security latch includes the latch base 100, a latch tongue 250, the pintle-brace 300, the security pin 350, and the strike plate 700. These figures introduce the basic components of the security latch with the strike plate 700, which are further detailed in subsequent figures.

Figure 7:
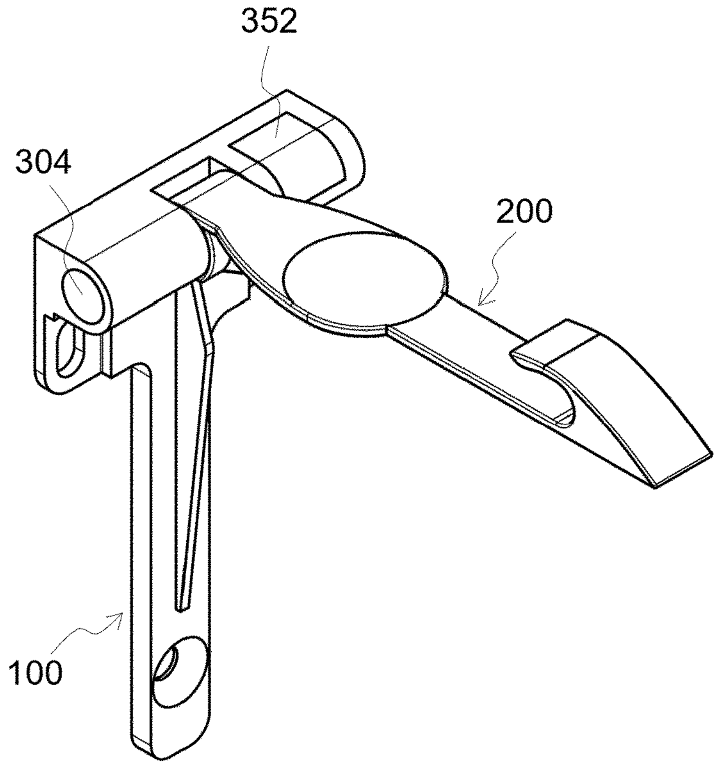
FIG. 7 shows an isometric view of the exemplary security latch in the active position.
Figure 8:
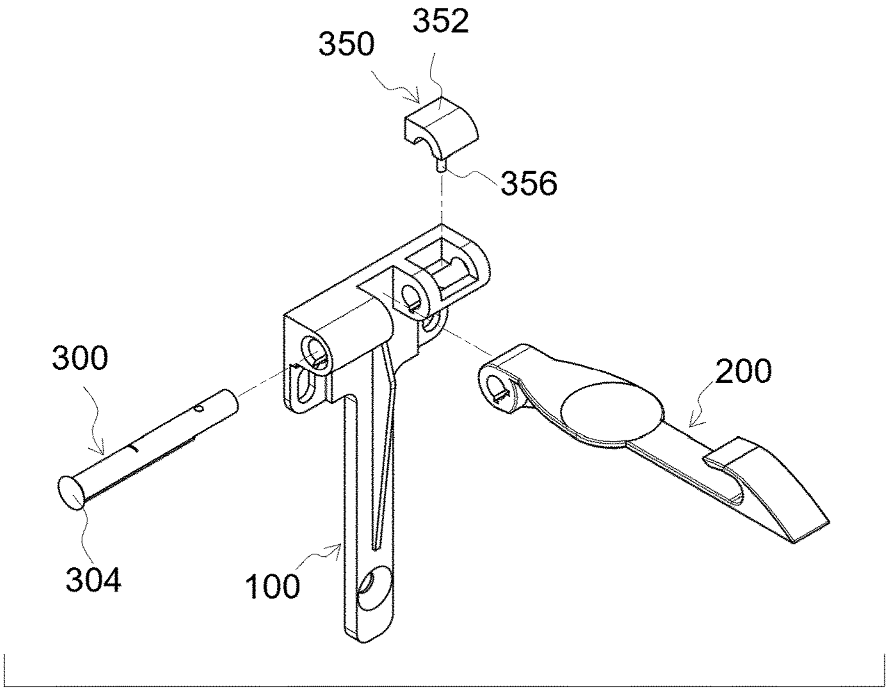
FIG. 8 shows an exploded view of the exemplary security latch in the active position.

FIG. 7 shows an isometric view of an exemplary security latch in the active position. FIG. 8 shows an exploded view of the security latch in the active position. The exploded view provides a clearer view of the pintle-brace 300 and the security pin 350. Additionally, the exploded view shows the latch base 100 and the latch tongue 200. These figures introduce the basic components of the security latch which are further detailed in subsequent figures.

Figure 9:
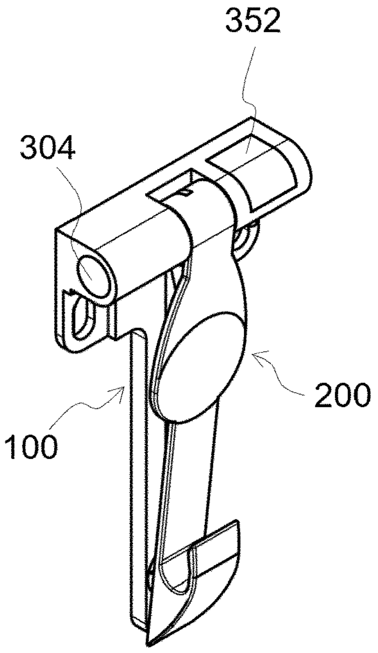
FIG. 9 shows an isometric view of the exemplary security latch in the inactive position.
Figure 10:
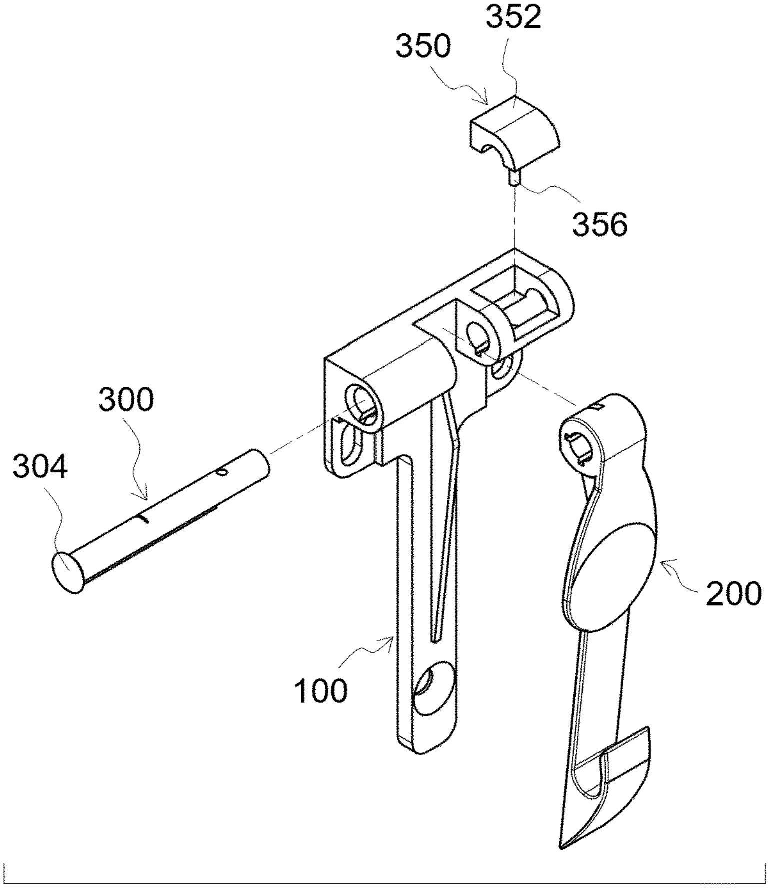
FIG. 10 shows an exploded view of the exemplary security latch in the inactive position.

FIG. 9 shows an isometric view of the security latch in the inactive position. FIG. 10 shows an exploded view of the security latch in the inactive position. The exploded view provides a clearer view of the pintle-brace 300 and the security pin 350. Additionally, the exploded view shows the latch base 100 and the latch tongue 200. These figures introduce the basic components of the security latch which are further detailed in subsequent figures.

Figure 11:
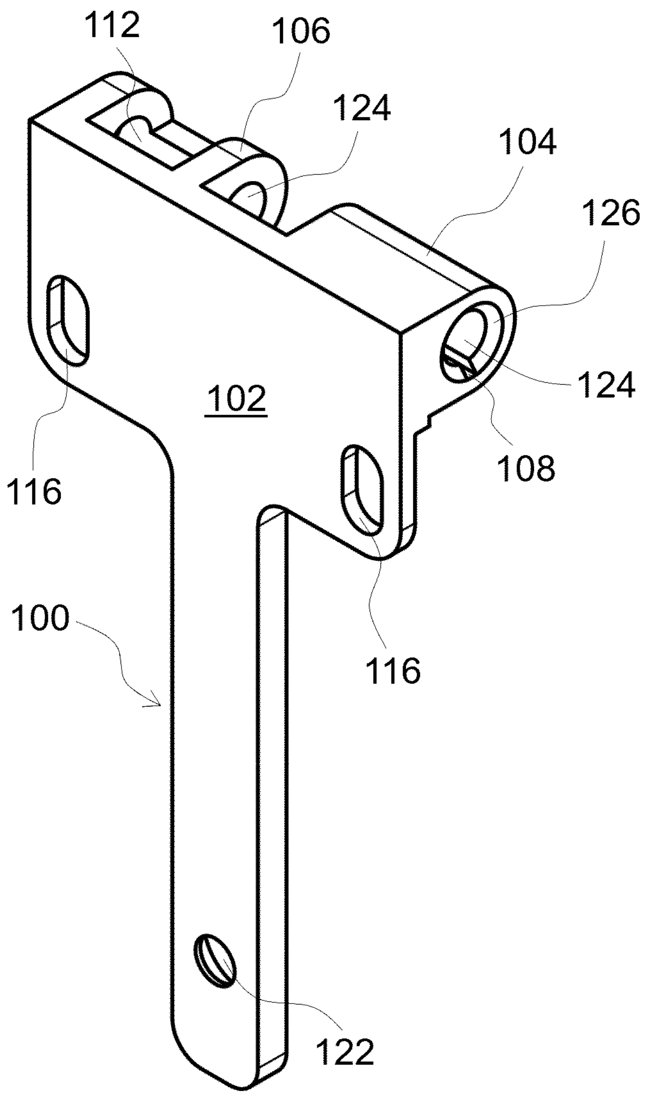
FIG. 11 and FIG. 12 show isometric views of an exemplary latch base plate.
Figure 12:
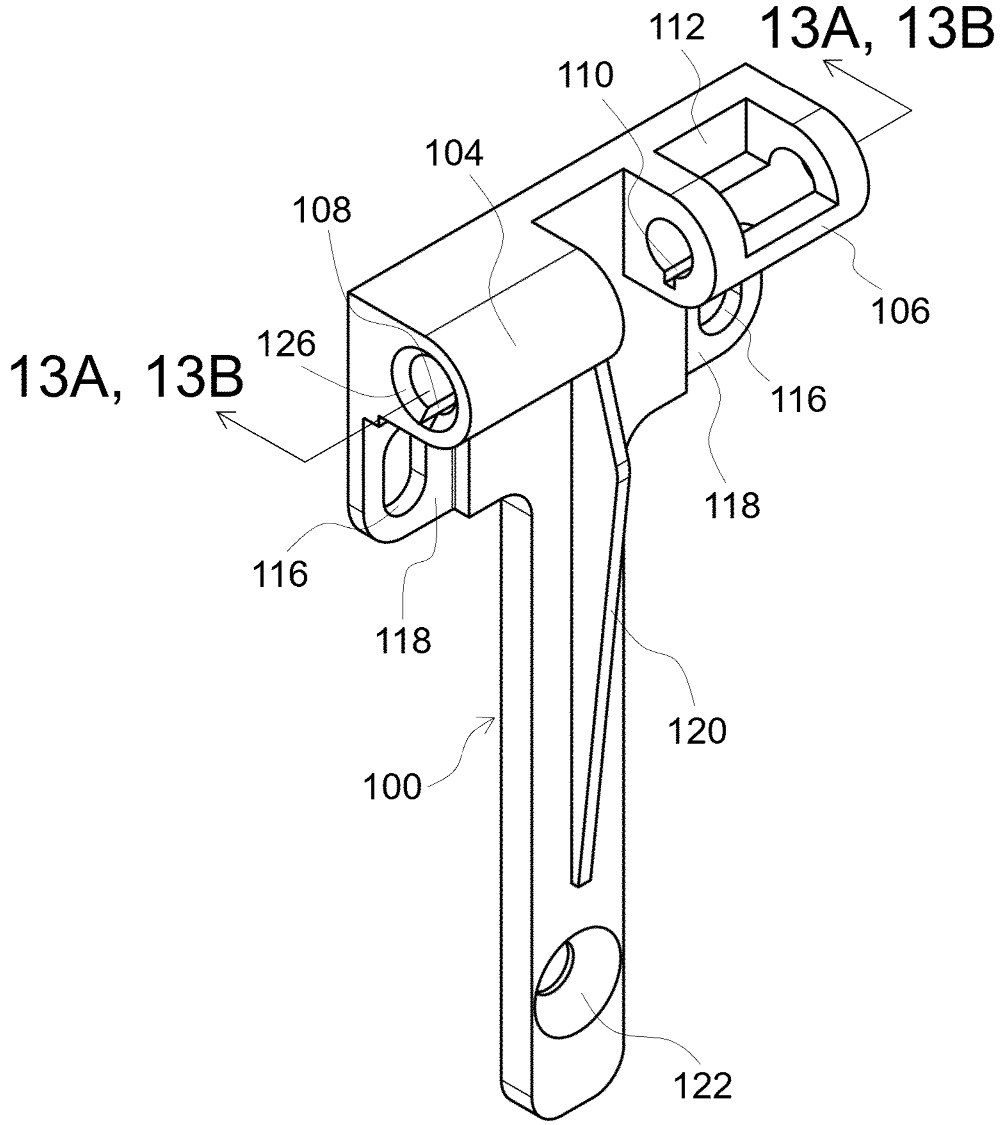
Figure 13A:
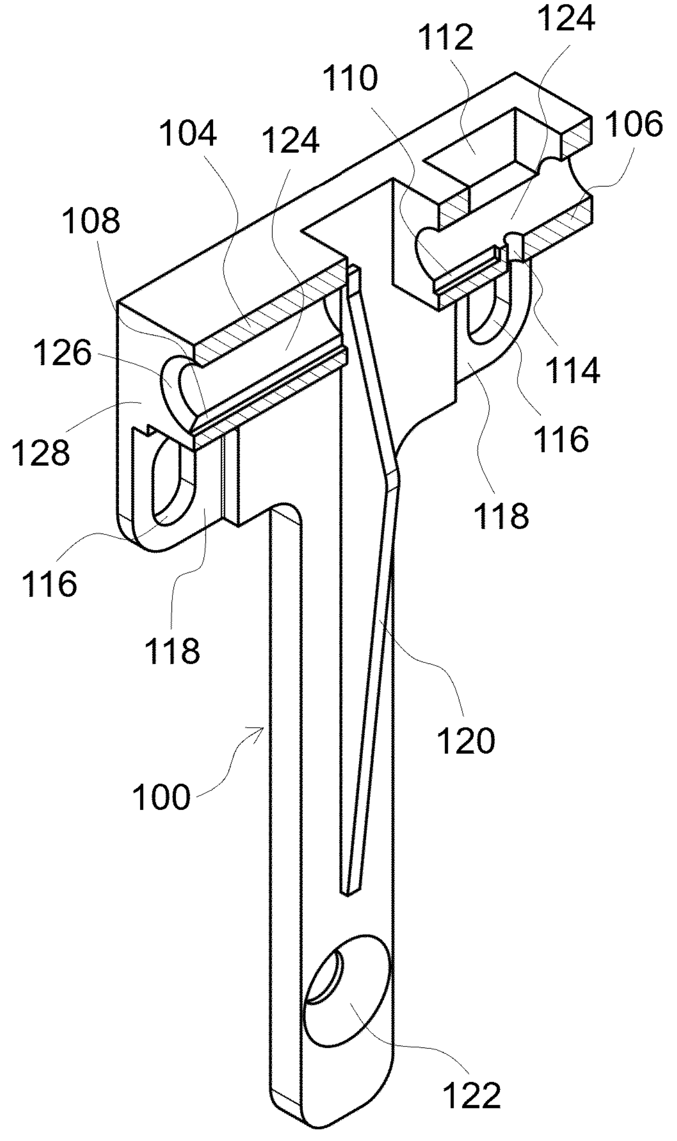
FIG. 13A and FIG. 13B show a sectional view, identified in FIG. 12, of the exemplary latch base plate.
Figure 13B:
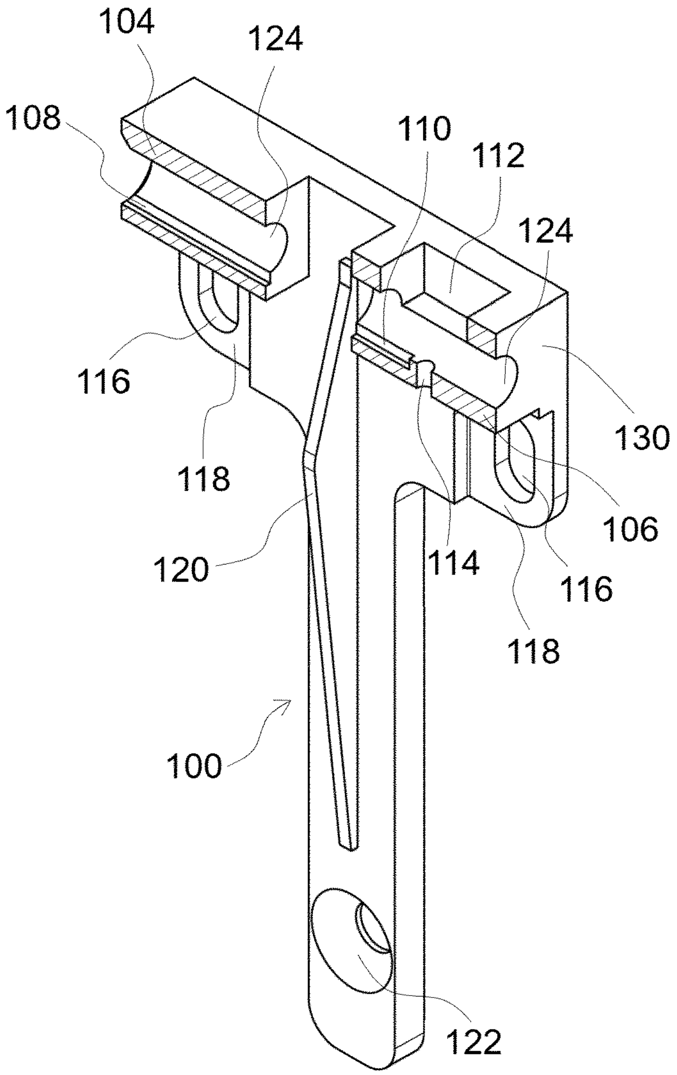

FIG. 11 and FIG. 12 show isometric views of the latch base plate. FIG. 13A and FIG. 13B show a sectional view, identified in FIG. 12, of the latch base plate. The latch base 100 is mounted to a storage access closeout, i.e., a cabinet door, drawer face, or similar structure, using either screws mounted through multiple fastener holes 116 and a countersunk fastener hole 122, or by using an adhesive strip of suitable strength cut to fit a front face 102 of the latch base 100. The latch base 100 can be formed from plastics, for example semicrystalline thermoplastics having sufficient material properties to support the expected applied operational loading over the service life of the security latch, or metal, or other material having sufficient material properties to support the expected applied operational loading over the service life of the security latch. In some implementations, the material used may be determined by the operational loading on the security latch based on the particular application, and the desired service life.

FIG. 11 shows the isometric view of the base 100 looking, for a standard vertical installation, from the front, right side of the base 100 downward. The front face 102 of the base 100 can be used to apply pre-cut adhesive pads to facilitate easier installation onto the storage compartment closeout. Multiple slotted fastener holes 116, each located on an offset slotted fastener hole surface 118, and one countersunk fastener hole 122 are available for more secure installation of the base 100. A hinge brace knuckle 104 and a hinge security knuckle 106 both contain a pintle-brace hole 124. The sectional views, FIG. 13A and FIG. 13B, taken from FIG. 12, shows the pintle-brace hole 124 in more detail. The pintle-brace hole 124 is comprised of the hole itself, a pintle-brace head countersink 126, and multiple brace slots, one brace slot on brace knuckle 108 that runs through the entirety of the hinge brace knuckle 104, and one brace slot on security knuckle 110 that runs partially through the hinge security knuckle 106. The pintle-brace 300 fits into the pintle-brace hole 124 and when fully inserted is flush with the base 100 as shown in FIGS. 7 and 9. The hinge security knuckle 106 also holds a base security pin hole 114, and a security pin head dock 112. The security pin hole 114 extends through the entirety of the lower part of the hinge security knuckle 106, as shown in FIG. 13A and FIG. 13B. A guide fin 120 is positioned on the base 100 to slide into a guide track 218 on the tongue 200 or 250 when the tongue 200 or 250 is retracted into the inactive position as in FIG. 9, and to provide stability as the tongue 200 or 250 is rotated into the active position as in FIG. 7

Figure 14:
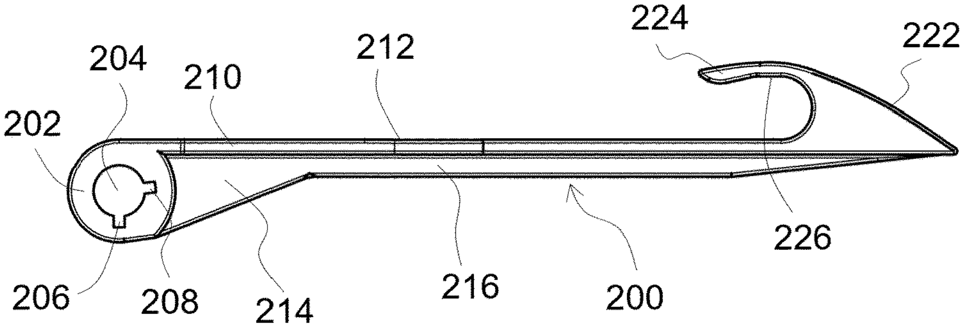
FIG. 14 shows a side profile view of the exemplary latch tongue.
Figure 15:
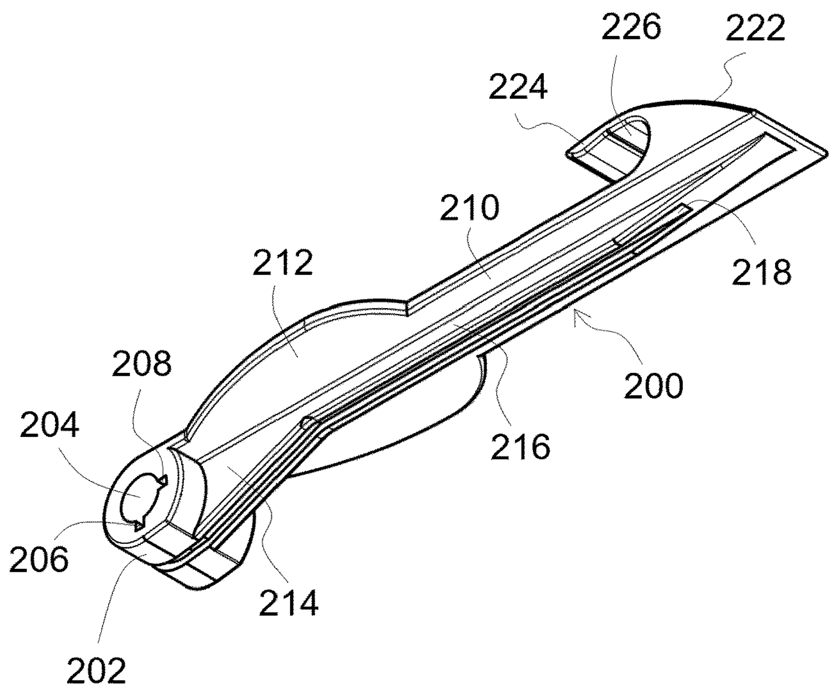
FIG. 15, FIG. 16, and FIG. 17 show isometric views of the exemplary latch tongue.
Figure 16:
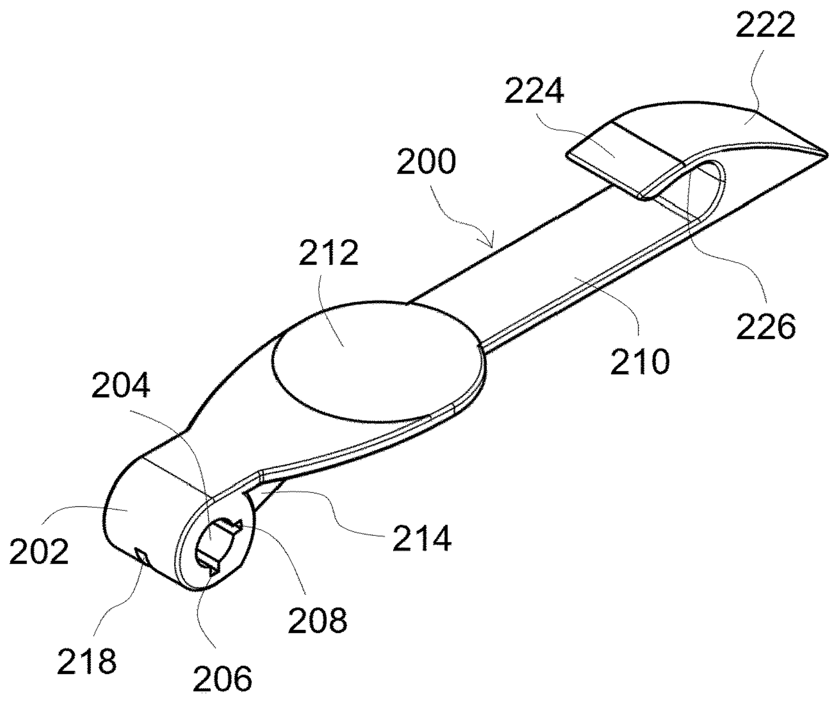
Figure 17:
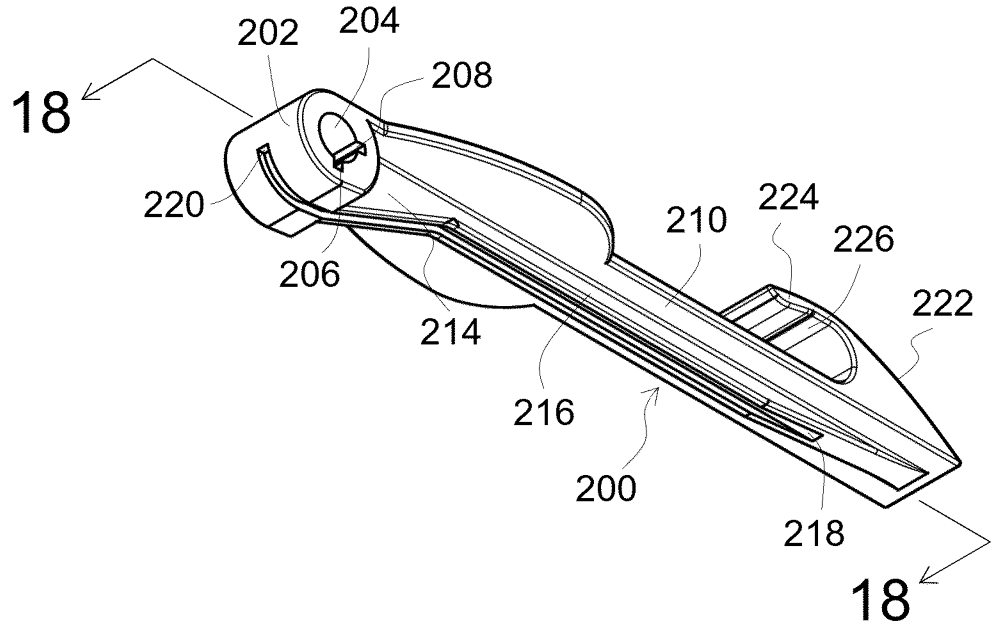
Figure 18:
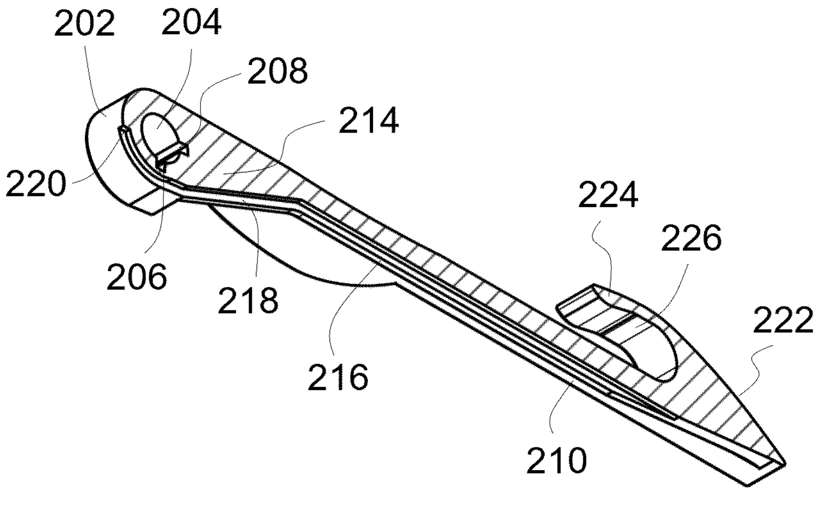
FIG. 18 shows a sectional view, identified in FIG. 17, of the exemplary latch tongue.
Figure 19:
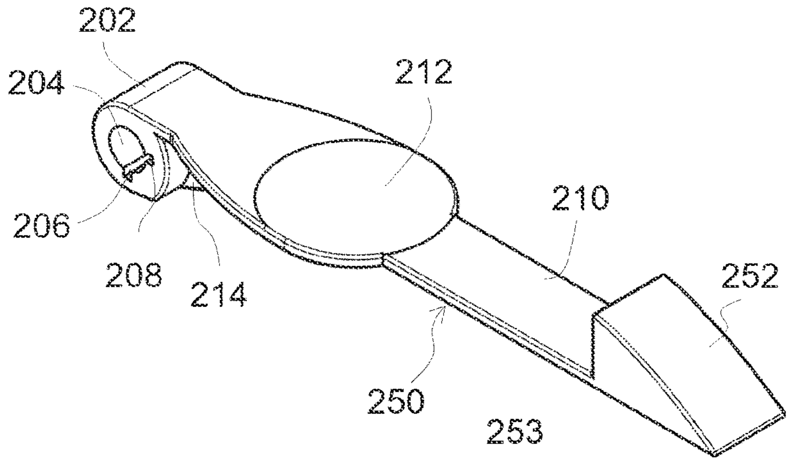
FIG. 19 and FIG. 20 show isometric views of the second embodiment of the exemplary latch tongue.
Figure 20:
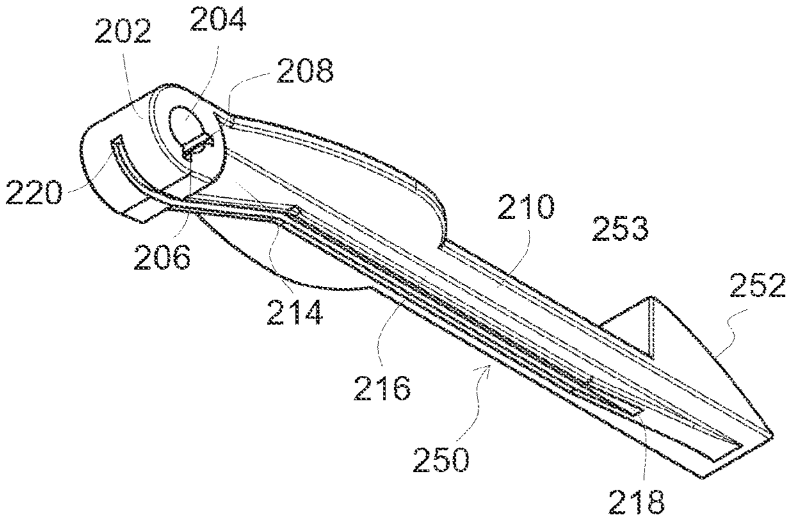

FIG. 14 shows a side profile view of the latch tongue. FIG. 15, FIG. 16, and FIG. 17 show isometric views of the latch tongue. FIG. 18 shows a sectional view, identified in FIG. 17, of the latch tongue. FIG. 19 and FIG. 20 show isometric views of the second embodiment of the latch tongue.

The latch tongue 200 or 250 can be positioned in an active state, as in FIG. 7, or an inactive state, as in FIG. 9. Due to the functioning of the latch, the tongue 200 or 250 must be made from a material that will, under reasonable load applied with a human finger to the area of a finger press incurvated surface 212, allow a ramp 222 to be deflected far enough so as to not engage any of the striker embodiments (400, 450, 500, 550, 600, or 650, detailed below) or the strike plate 700 during operation of the storage compartment closeout. In some examples, material for the tongue 200 may be plastic, such as a semicrystalline thermoplastic. In some examples, any material that meets the required deflection under reasonable load and has appropriate fatigue and fracture resistance can suffice.

FIG. 14 shows a profile view of the latch tongue 200. A hinge tongue knuckle 202 includes a pintle hole 204 with an active lock slot 206 and an inactive lock slot 208. These slots correspond to the boss 308 on the pintle-brace 300 and secure the hinge tongue knuckle 202, and consequently the tongue 200 or 250, in the desired functionality position. A web 216 and a flange 210 of the tongue provide structural strength, while multiple gussets 214 eliminates the high stress at the web—knuckle interface. Through the web 216, the guide track 218 provides alignment for the tongue 200 or 250 as the tongue 200 or 250 is rotated into or out of the inactive position as shown in FIG. 9. A guide track stop 220 prevents over rotation of the tongue 200 or 250 when rotating into the active position, and assures that full insertion of the pintle-brace 300 when the tongue 200 or 250 is against the guide track stop 220 will result in the security latch being locked into the active position, as in FIG. 7. The guide track 218 and the guide track stop 220 are more clearly shown in FIG. 18, the sectional view defined in FIG. 17. The ramp 222 of the tongue 200 or a ramp 252 of the second tongue embodiment 250 ensures that as the storage compartment closeout is closed, the latch tongue 200 or 250 will deflect enough to allow the storage compartment closeout to close with minimal effort, preventing access into the compartment. After closure, the ramp 222 of the tongue 200 or the ramp 252 of the second tongue embodiment 250 will return to its biased position, and in the event that the closeout to the compartment is attempted to be opened, a hook 224 of the tongue 200 embodiment, or the ramp 252 of the second tongue embodiment 250 will engage the striker (embodiments 400, 450, 500, 550, 600, or 650, detailed below) and prevent access into the compartment. In the event of a desire for a positive lock open or ajar application of the latch, such as allowing ventilation into a compartment while still restricting access to the contents of said compartment, the hook 224 of tongue embodiment 200 engages on any of the striker embodiments (400, 450, 500, 550, 600, or 650, detailed below), and prevents the compartment closeout from either opening further, or closing without intervention. An elongated throat 226 of tongue embodiment 200 ensures that stresses on the hook 224 do not cause failure of the tongue 200, as the hook 224 is able to move freely as necessary against a striker cylinder 404.

As an illustrative example, the latch tongue 200 may be extending in a first plane. For example, the latch base 100 may be extending in a second plane. For example, when the pintle-brace 300 is operated into the pintle-brace hole 124 and the pintle hole 204, the boss 308 may slidingly engage at least a the active lock slot 206 or the inactive lock slot 208 of the latch tongue 200 and the brace slots (on the brace knuckle 108 and the security knuckle 110) of the latch base 100, For examples, the latch tongue 200 and the latch base 100 may be selectively coupled in the active mode or the inactive mode. In some implementations, in an active mode, the latch tongue 200 may away from the latch base 100 to releasably engage a striker element. In the inactive mode, in some implementations, the latch tongue 200 is parallel to the latch base 100 and does not engage the striker element.

In some implementations, the hook 224 may have a substantially cylindrical cavity with a first radius (D1). For example, the cavity may be configured to releasably couples to a substantially cylindrical locking member 604 with a second radius (D2) of the striker embodiment 600. In some examples, D1<D2, for example, to disengage the tongue element and the strike element, a downward force larger than a predestined disengagement force may be applied at the tongue element 200.

FIGS. 19 and 20 show a second embodiment of the tongue 250, in which the hook 224 and the elongated throat 226 are replaced with the ramp 252 and a wall 253. This embodiment is meant to be applicable to situations where positive locking of the storage compartment closeout is not required; otherwise, the functioning is the same as tongue embodiment 200.

Figure 21:
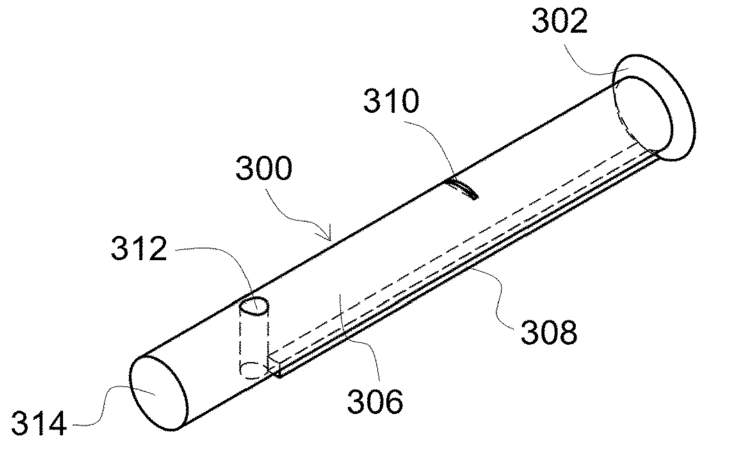
FIG. 21 and FIG. 22 show isometric views of an exemplary pintle-brace.
Figure 22:
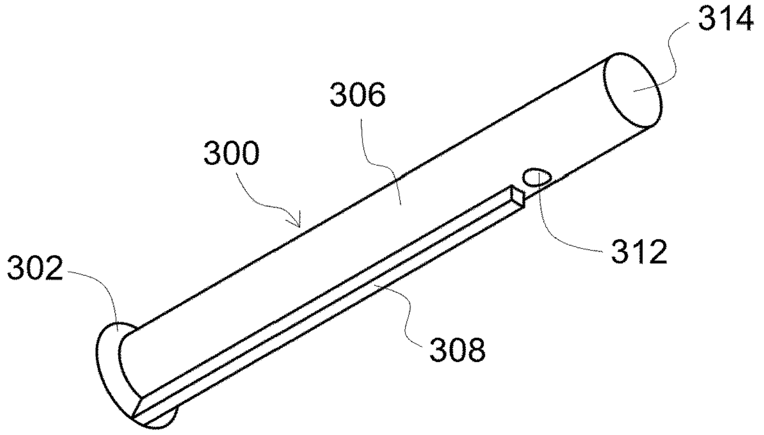
Figure 23:
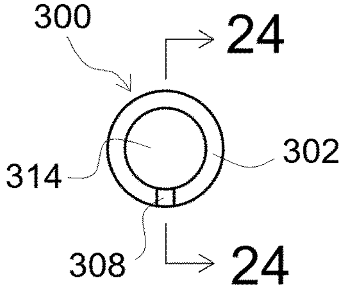
FIG. 23 shows a profile view of the exemplary pintle-brace.
Figure 24:
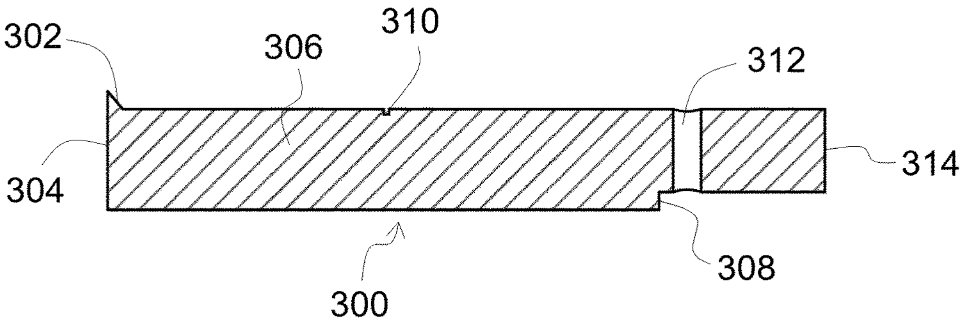
FIG. 24 shows a sectional view, identified in FIG. 23, of the exemplary pintle-brace.

FIG. 21 and FIG. 22 show isometric views of the pintle-brace. FIG. 23 shows a profile view of the pintle-brace. FIG. 24 shows a sectional view, identified in FIG. 23, of the pintle-brace. The pintle-brace 300 serves to lock the tongue 200 or 250 in place. The pintle-brace 300 can be made from a semicrystalline thermoplastic, a metal, or other material having sufficient material properties to provide the bracing function for the tongue 200 or 250.

FIG. 21 shows the features of the pintle-brace 300. A countersunk head 302 allows for the brace to easily be positioned as needed for either the rotation of the tongue 200 or 250, or to lock said tongue 200 or 250 in place for the active or inactive states. When fully inserted, the countersunk head 302 provides a stop for the pintle-brace 300 and a countersunk head surface 304 lies flush with a hinge brace knuckle outer surface 128 and an end surface 314 lies flush with a hinge security knuckle outer surface 130. A cylinder 306 allows for rotation when the pintle-brace 300 is moved to the point where a notch 310 becomes visible alongside the hinge brace knuckle outer surface 128. When fully inserted, a boss 308 provides cantilever support for the tongue 200 or 250. A pintle security pin hole 312 allows for a pin shaft 356 of the security pin 350 to be inserted through the cylinder 306 of the pintle-brace 300, securing it in the assembly and preventing inadvertent displacement of the pintle-brace 300. FIG. 24, a sectional view taken from FIG. 23, shows the pintle security pin hole 312 passing through the entire thickness of the cylinder 306.

Figure 25:
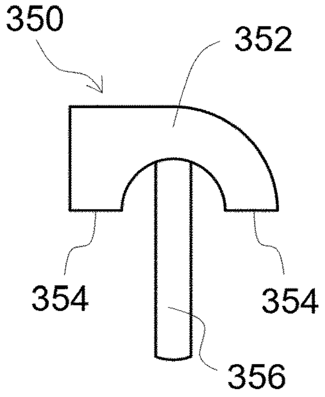
FIG. 25 shows a profile view of an exemplary security pin.
Figure 26:
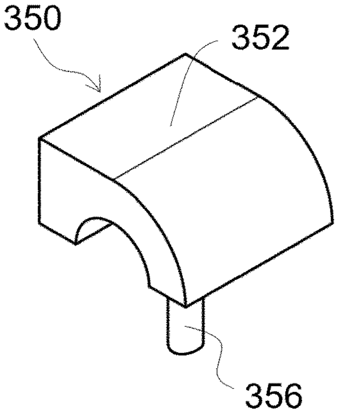
FIG. 26 shows an isometric view of the exemplary security pin.

FIG. 25 shows a profile view of the security pin. FIG. 26 shows an isometric view of the security pin. In the depicted example, the security pin 350 includes a head 352. The head 352 has a head bottom surface 354. The security pin 350 serves as a lock pin and, when fully inserted, prevents the pintle-brace 300 from inadvertently being displaced into a non-functioning position. The security pin 350 can be made from a semicrystalline thermoplastic, a metal, or other material having sufficient material properties to provide the securing function for the pintle-brace 300.

Figure 27:
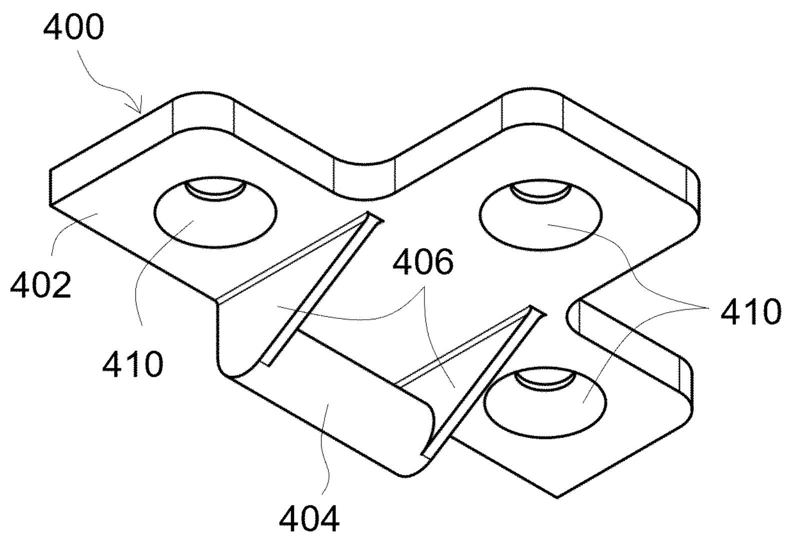
FIG. 27 and FIG. 28 show isometric views of one embodiment of an exemplary striker.
Figure 28:
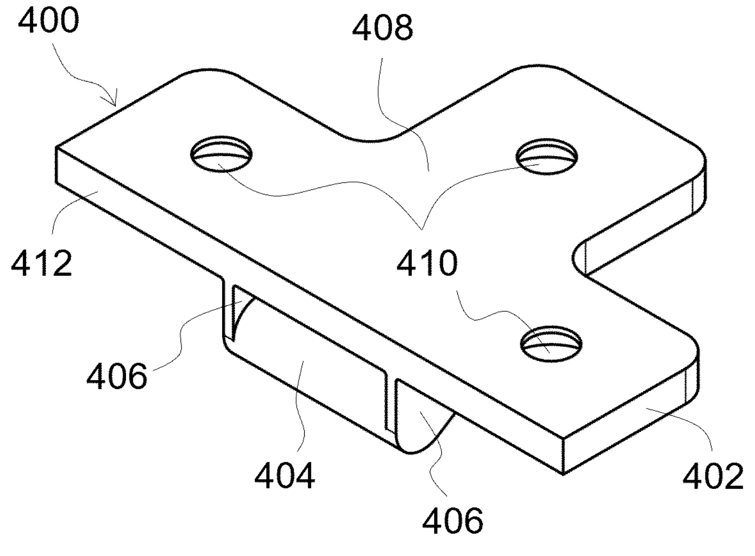

FIG. 27 and FIG. 28 show isometric views of one embodiment of the striker. The striker and strike plate embodiments (400, 450, 500, 550, 600, 650, and 700) serve to enable to latching and positive locking functions of the security latch in various applications and to protect the finish of cabinetry where applicable. These embodiments can be made from a semicrystalline thermoplastic, a metal, or other material having sufficient material properties to provide the securing and positive latching functions for the latch tongue 200 or 250.

FIGS. 27 and 28 show isometric views of the first striker embodiment 400. A base 402 supports the striker cylinder 404 by way of multiple gussets 406. The striker cylinder 404 is meant to be engaged by the hook 224, and is sized such that, once engaged, the hook 224 will not release from the striker cylinder 404 without positive force to disengage it being applied to the hook 224, for example, pushing the compartment closeout closed. This striker embodiment 400 can be mounted to the storage compartment either through countersunk fasteners inserted through multiple fastener holes 410 through the base 402, or by an adhesive pad of sufficient strength attached to an interface surface 408 where the striker 400 mates to the storage compartment structure. A front edge 412 of the striker 400 is used to align the striker 400 with the storage compartment structure as required to ensure that the closeout for the storage compartment can be fully closed.

Figure 29:
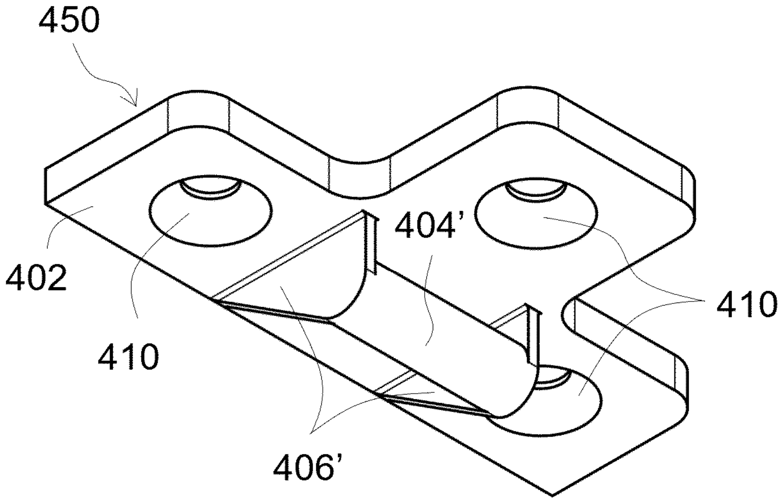
FIG. 29 and FIG. 30 show isometric views of another embodiment of the exemplary striker.
Figure 30:
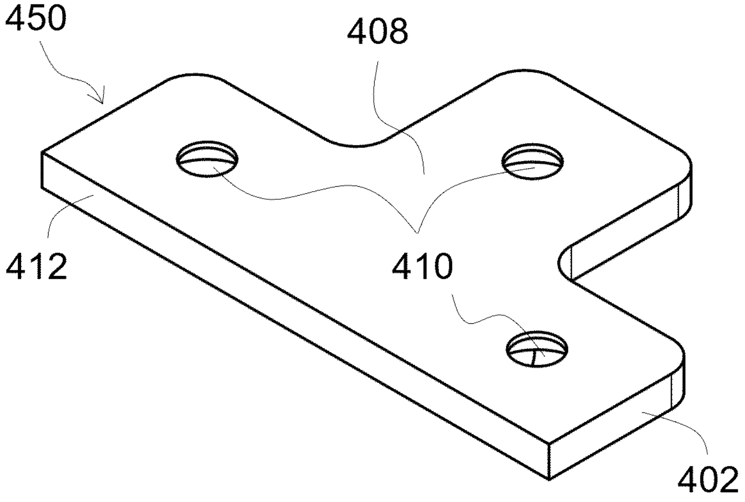

FIG. 29 and FIG. 30 show isometric views of another embodiment of the striker. The main difference between the two embodiments 400 and 450 are that instead of a striker cylinder 404' being aligned with the front edge 412 of the second striker embodiment 450, the thin edges of multiple gussets 406' are aligned with the front edge 412. This provides a shorter throw for the latch for applications where said shorter throw is more desirable to restrict access.

Figure 31:
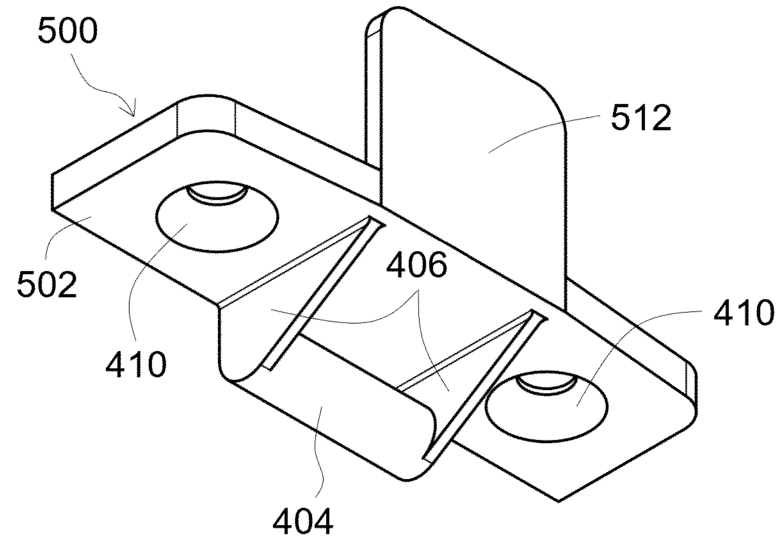
FIG. 31 and FIG. 32 show isometric views of another embodiment of the exemplary striker.
Figure 32:
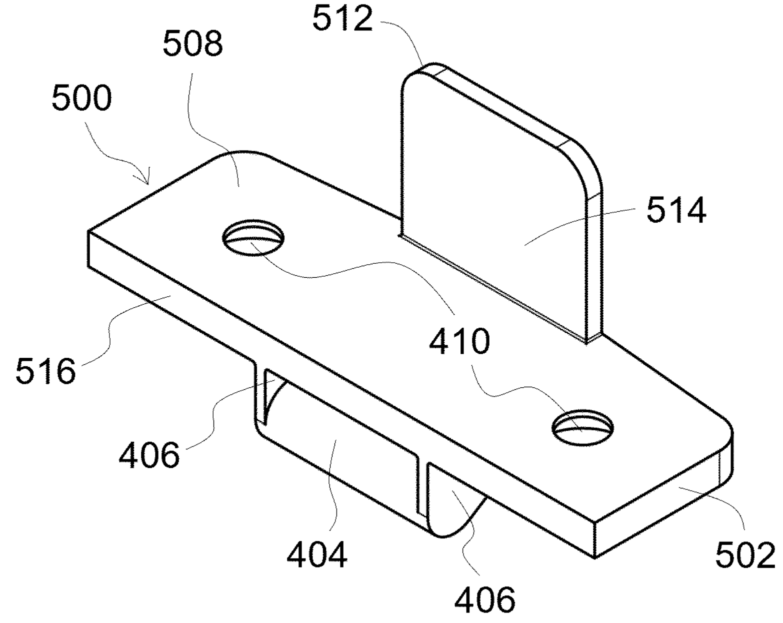

FIG. 31 and FIG. 32 show isometric views of another embodiment of the striker. FIGS. 31 and 32 show isometric views of the third striker embodiment 500. A base 502 supports the striker cylinder 404 by way of the gussets 406. In some implementations, the striker cylinder 404 may engage by the hook 224, and may be sized such that, once engaged, the hook 224 may not be released from the striker cylinder 404 without positive force to disengage it being applied to the hook 224, for example, pushing the compartment closeout closed. This third striker embodiment 500 can be mounted to the storage compartment either through countersunk fasteners inserted through multiple fastener holes 410 through the base 502, or by adhesive pads of sufficient strength attached to an interface surface 508 and a support flange interface surface 514, on a support flange 512, where the third striker embodiment 500 mates to the storage compartment structure. For this embodiment, the base 502 is sized to match the storage compartment structure such that a front edge 516 of the third striker embodiment 500 is aligned with the storage compartment structure as required to ensure that the closeout for the storage compartment can be fully closed and the functionality of the security latch is not hindered.

Figure 33:
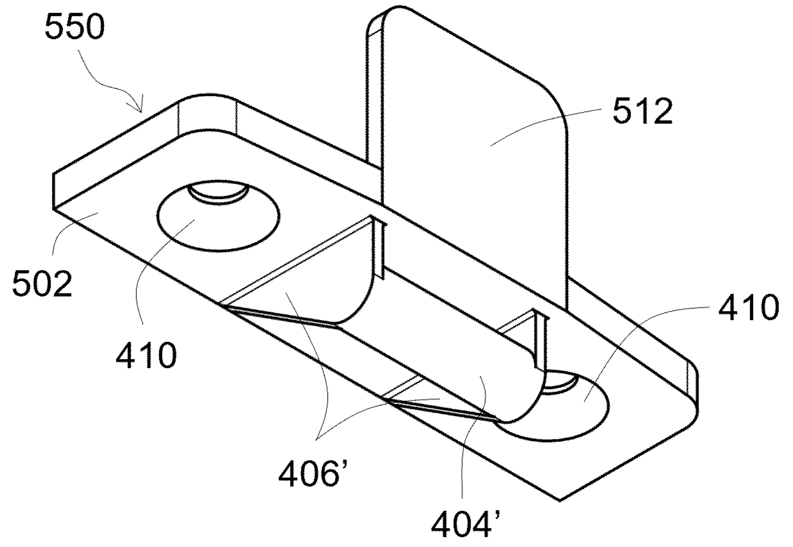
FIG. 33 and FIG. 34 show isometric views of another embodiment of the exemplary striker.
Figure 34:
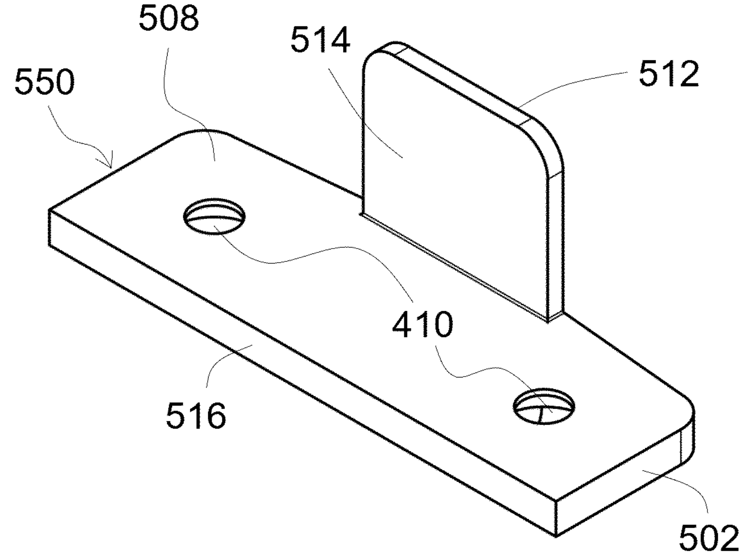

FIG. 33 and FIG. 34 show isometric views of another embodiment of the striker. FIGS. 33 and 34 show a fourth striker embodiment 550. The main difference between the two embodiments 500 and 550 are that instead of the striker cylinder 404' being aligned with the front edge 516 of the fourth striker embodiment 550, the thin edge of the gussets 406' are aligned with the front edge 516. This provides a shorter throw for the latch for applications where said shorter throw is more desirable to restrict access.

Figure 35:
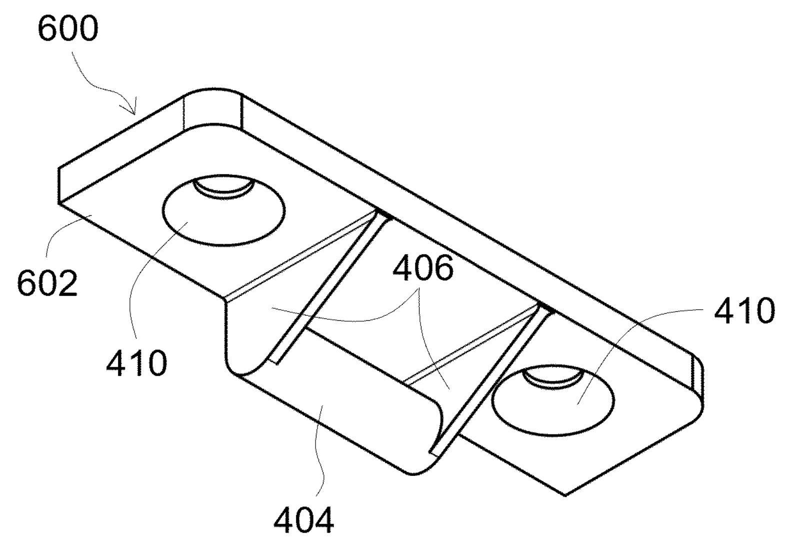
FIG. 35 and FIG. 36 show isometric views of another embodiment of the exemplary striker.
Figure 36:
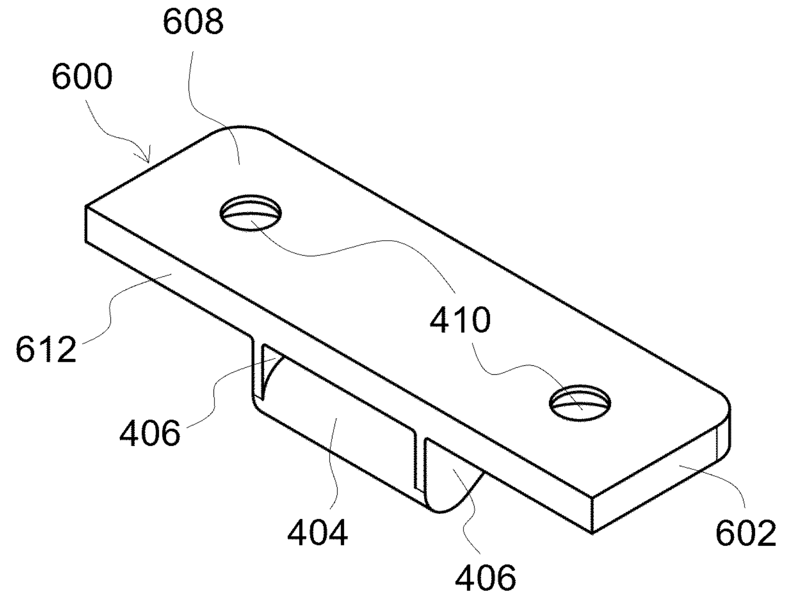

FIG. 35 and FIG. 36 show isometric views of another embodiment of the striker. FIGS. 35 and 36 show isometric views of the fifth striker embodiment 600. A base 602 supports the striker cylinder 404 by way of the gussets 406. The striker cylinder 404 is meant to be engaged by the hook 224, and is sized such that, once engaged, the hook 224 will not release from the striker cylinder 404 without positive force to disengage it being applied to the hook 224, for example, pushing the compartment closeout closed. This fifth striker embodiment 600 can be mounted to the storage compartment either through countersunk fasteners inserted through multiple fastener holes 410 through the base 602, or by an adhesive pad of sufficient strength attached to an interface surface 608 where the fifth striker embodiment 600 mates to the storage compartment structure. A front edge 612 of the fifth striker embodiment 600 is used to align the fifth striker embodiment 600 with the storage compartment structure as required to ensure that the closeout for the storage compartment can be fully closed.

Figure 37:
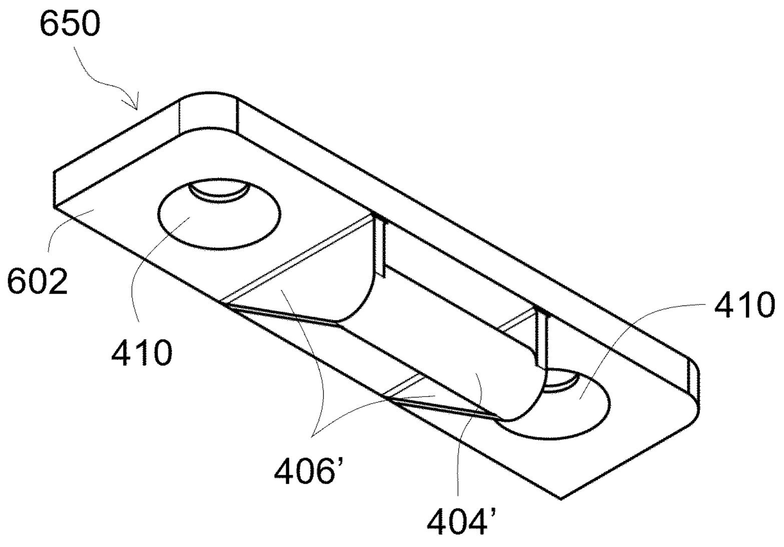
FIG. 37 and FIG. 38 show isometric views of another embodiment of the exemplary striker.
Figure 38:
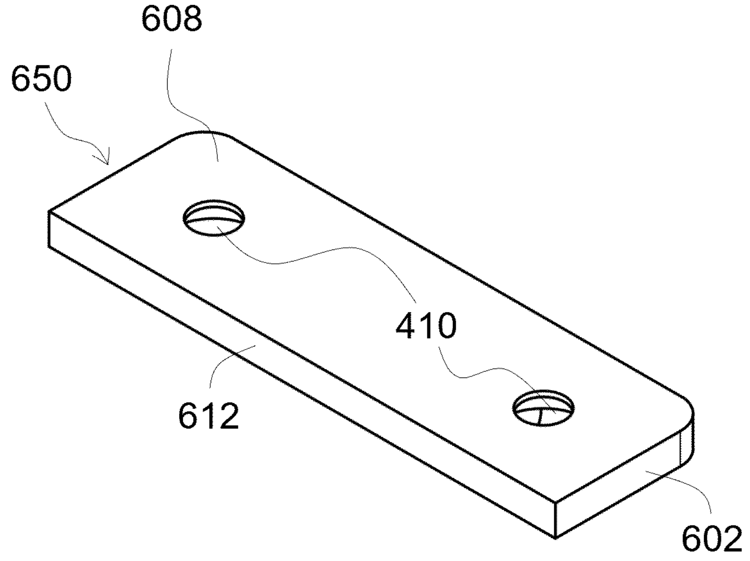

FIG. 37 and FIG. 38 show isometric views of another embodiment of the striker. FIGS. 37 and 38 show a sixth striker embodiment 650. The main difference between the two embodiments 600 and 650 are that instead of the striker cylinder 404' being aligned with the front edge 612 of the sixth striker embodiment 650, the thin edge of the gussets 406' are aligned with the front edge 612. This provides a shorter throw for the latch for applications where said shorter throw is more desirable to restrict access.

Figure 39:
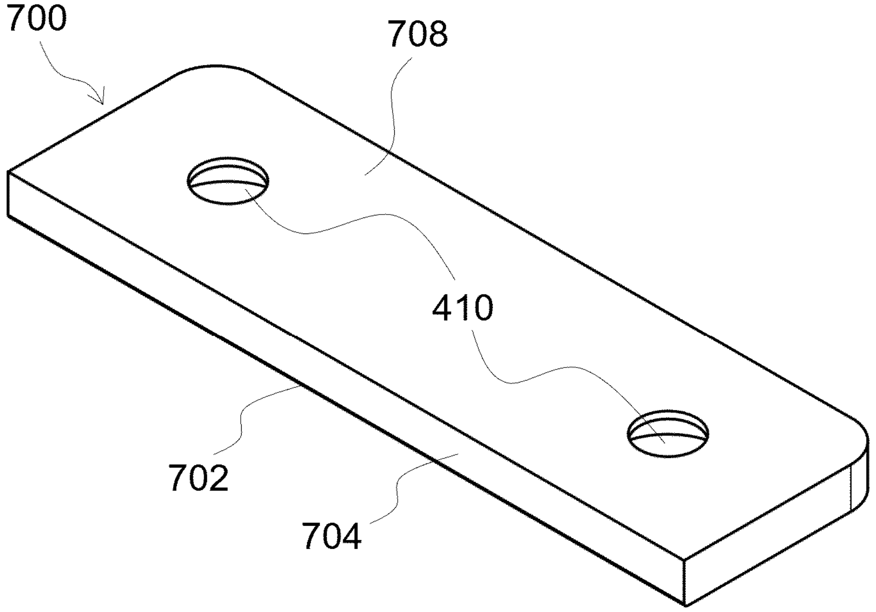
FIG. 39 and FIG. 40 show isometric views of an exemplary strike plate for use with the second embodiment of the latch tongue.
Figure 40:
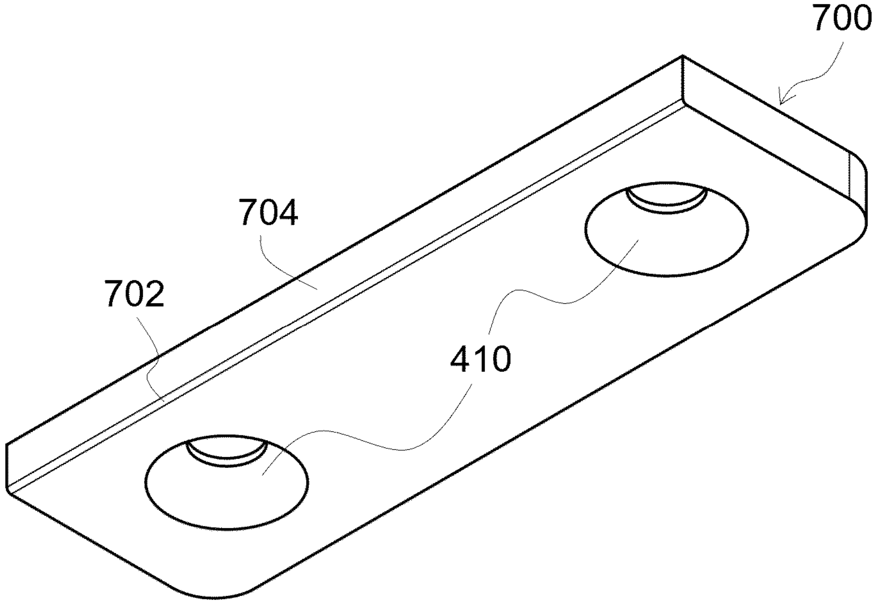

FIG. 39 and FIG. 40 show isometric views of the strike plate for use with the second embodiment of the latch tongue. FIGS. 39 and 40 show isometric views of the strike plate 700. The strike plate 700 is meant to be used with the second tongue embodiment 250. For this application, the ramp 252 contacts a radius 702 and protects the finish of the storage compartment from damage. Upon opening the compartment, the ramp contacts the compartment structure, restricting access to the compartment until the tongue 250 is depressed to clear the compartment structure and the strike plate 700. The strike plate 700 can be mounted to the storage compartment either through countersunk fasteners inserted through multiple fastener holes 410 through the strike plate 700, or by an adhesive pad of sufficient strength attached to an interface surface 708 where the strike plate 700 mates to the storage compartment structure. A front edge 704 of the strike plate 700 is used to align the strike plate 700 with the storage compartment structure as required to ensure that the closeout for the storage compartment can be fully closed.

Figure 41:
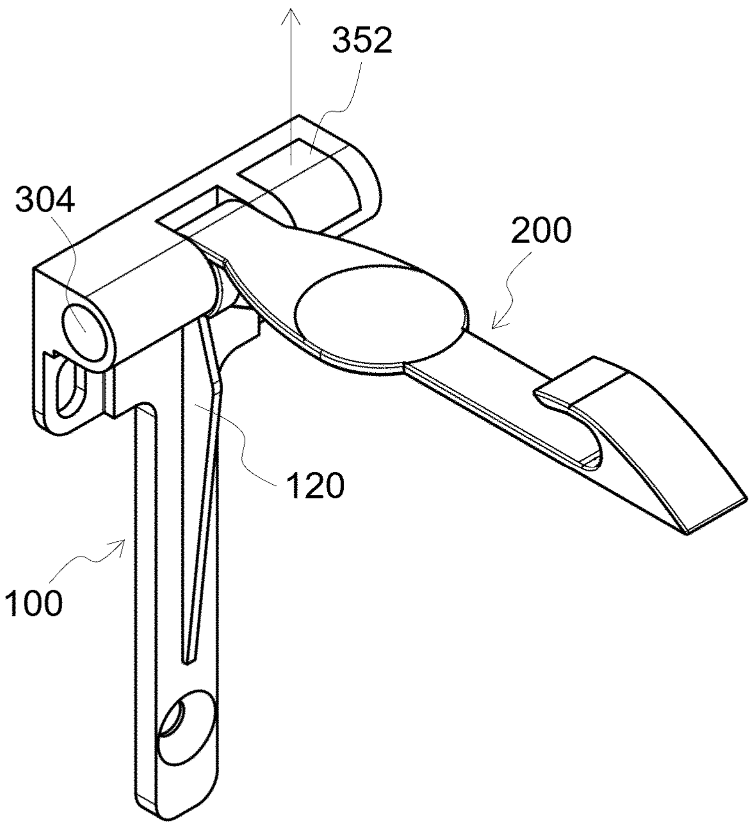
FIG. 41 shows an isometric view of the security latch in the active position.
Figure 42:
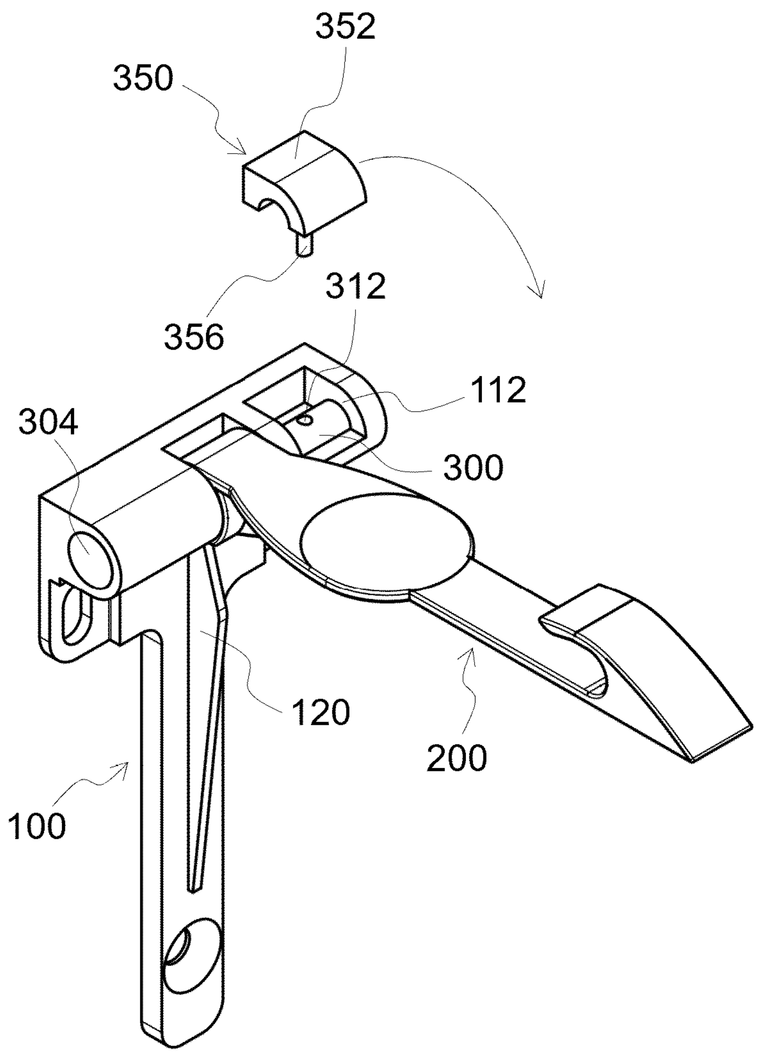
FIG. 42 shows an isometric view of the security latch with the security pin pulled from the pintle-brace.
Figure 43:
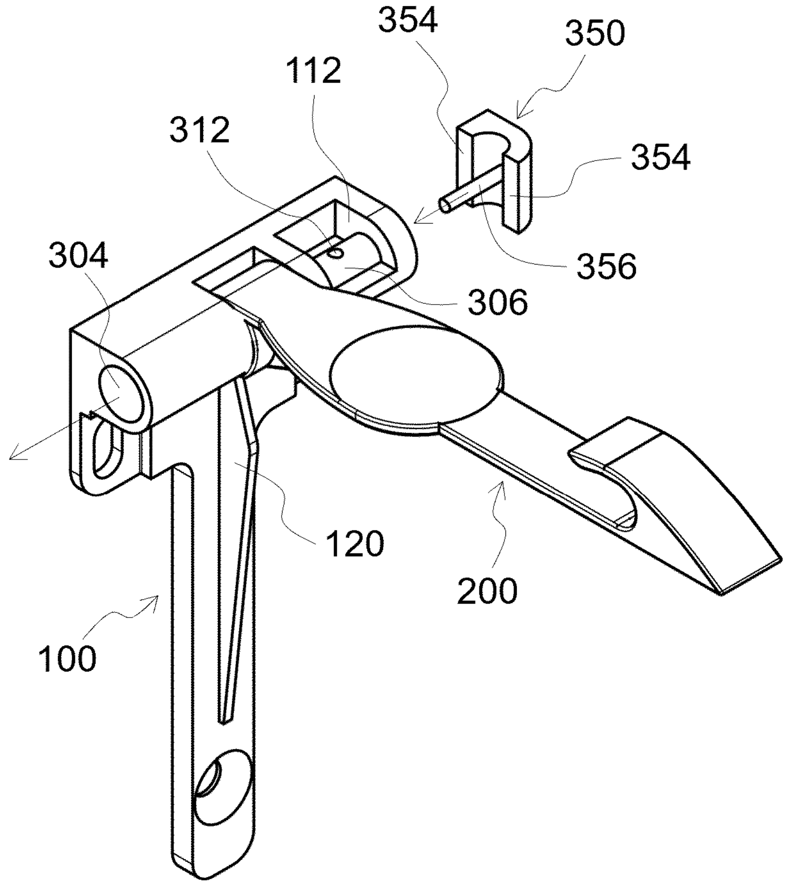
FIG. 43 shows an isometric view of the security latch with the security pin positioned to move the pintle-brace by contacting the end of the pintle-brace.
Figure 44:
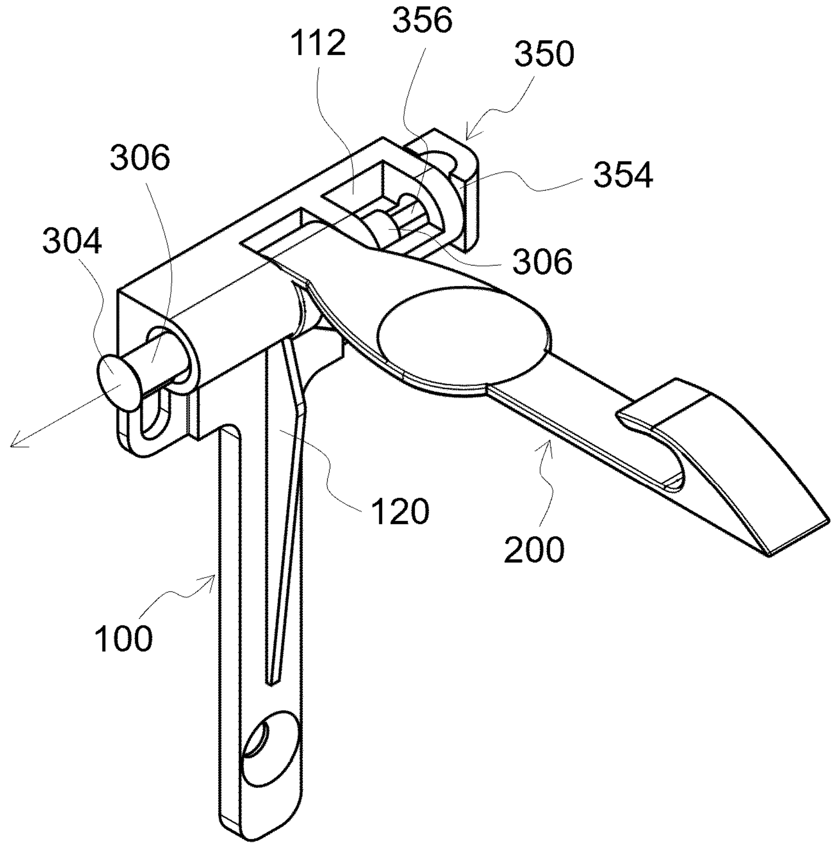
FIG. 44 shows an isometric view of the security latch with the security key contacting the base security hinge and displacing the pintle-brace.
Figure 45:
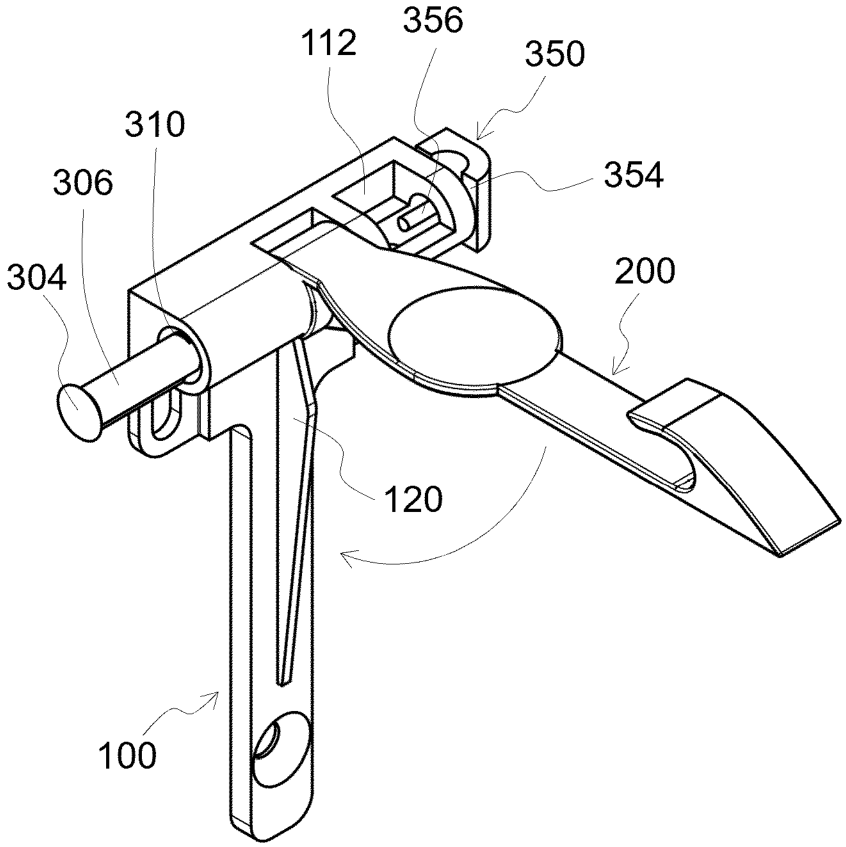
FIG. 45 shows an isometric view of the security latch with the pintle-brace displaced to the stop notch and the latch tongue ready to be rotated to the inactive position.
Figure 46:
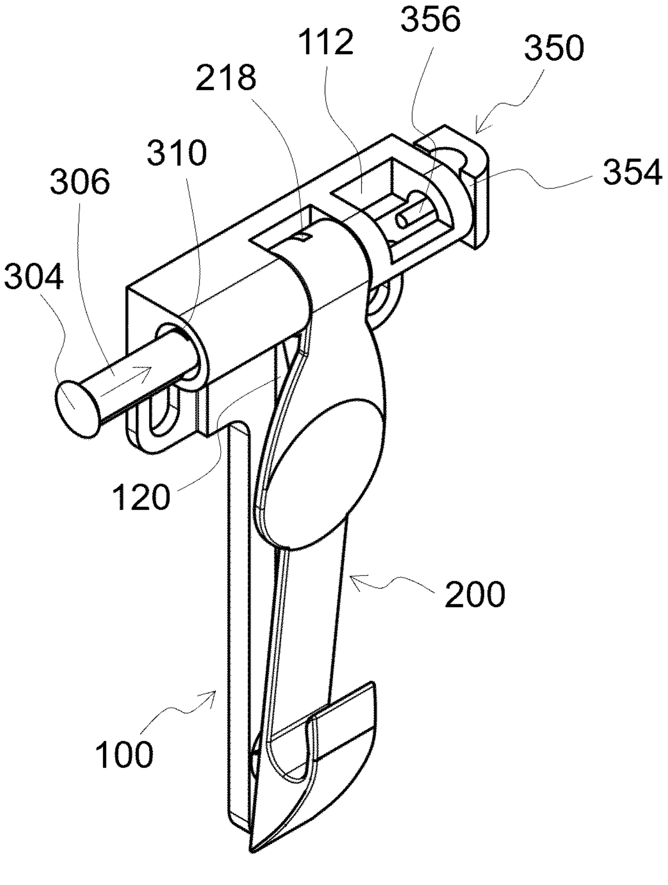
FIG. 46 shows an isometric view of the security latch with the latch tongue in the inactive position and the pintle-brace ready to be re-inserted into the latch base plate.
Figure 47:
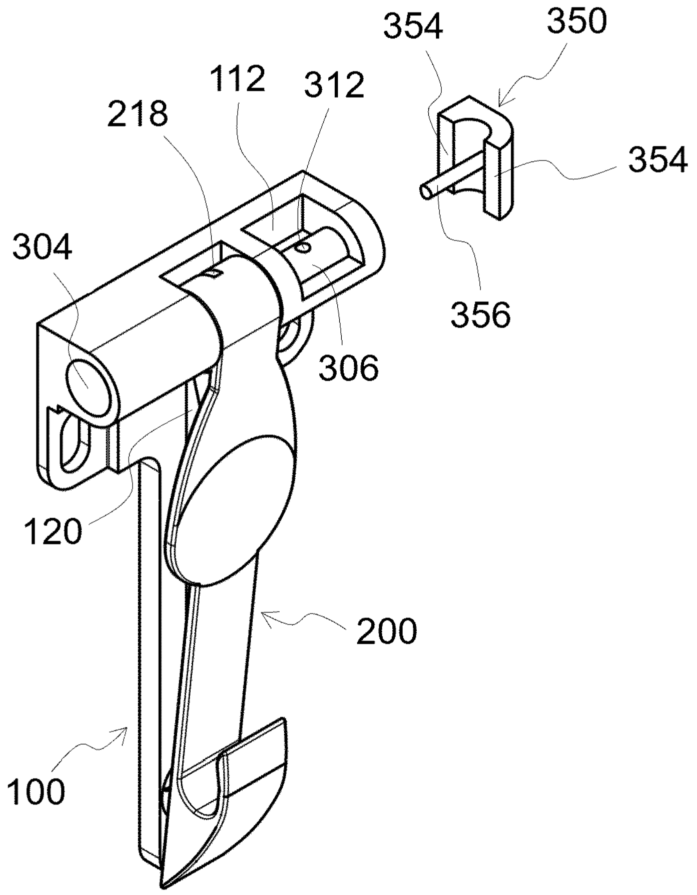
FIG. 47 shows an isometric view of the security latch with the pintle-brace reinstalled and the security pin ready to be reinstalled into the pintle security pin hole.

FIG. 41 shows an isometric view of the security latch in the active position. FIG. 42 shows an isometric view of the security latch with the security pin pulled from the pintle-brace. FIG. 43 shows an isometric view of the security latch with the security pin positioned to move the pintle-brace by contacting the end of said pintle-brace. FIG. 44 shows an isometric view of the security latch with the security key contacting the base security hinge and displacing the pintle-brace. FIG. 45 shows an isometric view of the security latch with the pintle-brace displaced to the stop notch and the latch tongue ready to be rotated to the inactive position. FIG. 46 shows an isometric view of the security latch with the latch tongue in the inactive position and the pintle-brace ready to be re-inserted into the latch base plate. FIG. 47 shows an isometric view of the security latch with the pintle-brace reinstalled and the security pin ready to be reinstalled into the pintle security pin hole. 250 and has cleared the active lock slot 206. The tongue 200 or 250 is rotated into place such that the guide fin 120 fills into the guide track 218. At this point, the pintle-brace 300 is reinserted fully. The boss 308 engages the inactive lock slot 208, securing the latch tongue 200 or 250 in the inactive position (FIG. 46). Finally, the security pin 350 is reinserted into the security pin head dock 112, with the pin shaft 356 passing through the pintle security pin hole 312 and the base security pin hole 114 as shown in FIG. 9.

To move the latch into the active position, the steps above are repeated with the exception that the latch tongue 200 or 250 is rotated until the guide track stop 220 contacts the guide fin 120. At this point, the active lock slot 206 is aligned with the boss 308 of the pintle-brace 300, and the latch can be secured in the active position by reinserting the pintle-brace 300 and securing it with the security pin 350.

Accordingly, the reader will see that the various embodiments of the retractable security latch with striker allow for the user to activate and deactivate the security latch to restrict access into a storage compartment at will, without the need for frequent removal and reinstallation of the latch, intrusion into the storage space, and/or parts that may wear and require replacement of the entire latch over time. Accordingly, the security latch with striker may reduce frequency of installation and removal of the security latch to resume normal operation of the storage compartment closeout to advantageously avoids damage to the existing structure.

In some implementations, the security latch may reduce risk of snagging or impingement while in the inactive position due to the low profile of the security latch in said position. In some implementations, the security latch may provide an extra layer of security against inadvertent release, or release by a determined individual for whom the latch is intended to restrict access, by virtue of the process for releasing the latch from the positive lock open or ajar position. In some implementations, the security latch may allow modular replacement of any broken or worn parts to advantageously reduce the need to replace the entire security latch by virtue of the modular design. In some implementations, the security latch may advantageously provide multiple configuration options that are compatible with various cabinet storage compartment designs. In some implementations, the security latch may advantageously provide installation flexibility while maintaining the intended functionality.

Although various embodiments have been described with reference to the figures, other embodiments are possible. For example, although an exemplary system has been described with reference to the figures, other implementations may be deployed in other industrial, scientific, medical, commercial, and/or residential applications.

As an illustrative example, the pintle-brace can be formed with a mating surface meant to engage a detent within the structure of the base that would eliminate the need for the security pin.

In some implementations, the shape of the security pin may, for example, be oval. In some implementations, the shape of the security pin may, for example, be polygonal (e.g., square, triangle).

In some implementations, other materials may become available that provide improved functionality or durability.

In some implementations, by way of example and not limitation, the alignment notch on the pintle-brace can be replaced with any other type of demarcation device that would allow for proper alignment of the pintle-brace to facilitate rotation of the tongue into the active or inactive position. In some implementations, a demarcation device may include, for example, different colors (e.g., red for inactive, green for active). Some implementations may provide, for example, a full perimeter groove and/or a line as at least part of a demarcation device.

In some implementations, sliding gears and/or other such mechanisms can be used, for example, to allow for rotation of the tongue and/or locking into the active, inactive, or a greater number of positions. In some examples the sliding gears and/or other such mechanisms may be used in place of the pintle-brace.

In some implementations, the base or strikers can be optimized to reduce weight and materials (e.g., including removal of one or more of the fastener holes). In some implementations, the base and tongue can be made longer or shorter to facilitate different applications.

In some implementations, the tongue may, for example, be of a different shape. In some implementations, the engagement mechanism for the tongue and striker may, for example, be of different shapes.

In some implementations, the tongue, base, and/or strikers can be connected to a sensor (e.g., Wi-Fi enabled) that would alert a connected monitoring device, such as a cell phone, television, or tablet, of (any) attempts to disengage the security latch, etc.

In an illustrative example, an improved security latch uses a cantilever mounted tongue with a two-position hinge knuckle that provides positive locking in active and inactive positions, as well as a low profile and ease of operation. This design may, for example, allow for mounting either by fasteners or an adhesive on the mating surfaces. One embodiment of the tongue and the included striker configurations may, for example, allow for positive locking of a cabinet door or drawer in a slightly open position to provide ventilation into the storage compartment while still restricting access to the contents within. In some implementations, no springs are used. Such spring-less implementations may, for example, extend lifetime reliability of the latch relative to latches requiring springs.

Accordingly, several advantages include, by way of example and not limitation, providing positive locking of the latch in the inactive position, positive locking of the door or drawer or other access device that allows for ventilation while still restricting access to the storage contents, a low profile that does not significantly intrude into the storage space, customizable configurations of the latch and striker combinations to suit different applications, ease of installation and assembly, modular components that provide easy repairability should it become necessary, and/or improved convenience for the user. Additional advantages will become apparent from a review of the description and the accompanying drawings.

In an illustrative aspect, a retractable safety latch may include a tongue element extending in a first plane. The retractable safety latch may include a base element extending in a second plane. The tongue element and the base element may each include a channel extending along a hinge axis at an intersection of the first plane and the second plane. The retractable safety latch may include a selection pin extending along a longitudinal axis. The retractable safety latch may include a security pin. The security pin may include a pin head. The security pin may include a pin shaft configured to engage a locking element of the selection pin. When the selection pin is operated into the channels such that the hinge axis and the longitudinal axis are parallel, at least a first locking feature of the selecting pin may slidingly engage at least a second locking feature of the tongue element and a third locking feature of the base element having the selection pin being locked into a selected position such that the tongue element and the base element are selectively coupled in one of multiple predetermined modes. In an active mode of the multiple predetermined modes, the first plane and the second plane may intersect such that the tongue element extends away from the base element to releasably engage a striker element. In a stowage mode of the multiple predetermined modes, the first plane and the second plane may be substantially parallel such that the tongue element does not engage the striker element.

The tongue element may include a hook having a substantially cylindrical cavity with a first radius (D1). The cylindrical cavity may be configured such that the hook releasably couples to a substantially cylindrical locking member of the striker element with a second radius (D2) of the striker element. D1 may be less than D2 such that, to disengage the tongue element and the striker element, a force applied at the tongue element may be required to exceed a predetermined disengagement force.

The retractable safety latch may include an elongated member coupling the hook to a body of the tongue element. The elongated member may extend parallel to the body of the tongue element. The elongated member may be configured such that, when the tongue element is selectively coupled to the striker element, the hook retains a margin of freedom against the cylindrical locking member to prevent failure of the tongue element.

The base element may include a front channel and a back channel such that, when the base element is coupled to the tongue element, the channel of the tongue element registers with the front channel and the back channel, and the selection pin is inserted through the first channel, the channel of the tongue element, and the back channel.

The channel of the base element may include an insertion aperture at a first end for inserting the selection pin and a release aperture at a second end for inserting the locking pin of the third locking feature such that, when the locking pin is operated into the release aperture, the selection pin is at least partially removed from the channel.

The first locking feature may include a selection fin. The second locking feature may include multiple mode selection slots. Each of the multiple mode selection slots may correspond to one of the predetermined multiple modes, such that when the selection fin is registered into one of the multiple mode selection slots, the corresponding one of the predetermined multiple modes is selected.

The base element may be mounted on a mating surface by adhesive. The base element may be mounted on a mating surface by fasteners.

In an illustrative aspect a retractable safety latch may include a tongue element extending in a first plane. The retractable safety latch may include a base element extending in a second plane. The tongue element and the base element may each include a channel extending along a hinge axis at an intersection of the first plane and the second plane. The retractable safety latch may include a selection pin extending along a longitudinal axis. When the selection pin is operated into the channels such that the hinge axis and the longitudinal axis are parallel, at least a first locking feature of the selecting pin may slidingly engage at least a second locking feature of the tongue element and a third locking feature of the base element such that the tongue element and the base element are selectively coupled in one of multiple predetermined modes. In an active mode of the multiple predetermined modes, the first plane and the second plane may intersect such that the tongue element extends away from the base element to releasably engage a striker element. In a stowage mode of the multiple predetermined modes, the first plane and the second plane may be substantially parallel such that the tongue element does not engage the striker element.

The element may include a hook having a substantially cylindrical cavity with a first radius (D1). The cylindrical cavity may be configured such that the hook releasably couples to a substantially cylindrical locking member of the striker element with a second radius (D2) of the striker element. D1 may be less than D2 such that, to disengage the tongue element and the striker element, a force applied at the tongue element may be required exceed a predetermined disengagement force.

The retractable safety latch may include an elongated member coupling the hook to a body of the tongue element. The elongated member may extend substantially parallel to the body of the tongue element. The elongated member may be configured such that, when the tongue element is selectively coupled to the striker element, the hook retains a margin of freedom against the cylindrical locking member to prevent failure of the tongue element.

The common element may include a hook having a wall of a predetermined height extended orthogonally to the tongue element such that, in the active mode, to disengage the tongue member and the striker element, a force applied at the tongue element must displace the hook by at least the predetermined height.

The base element may include a front channel and a back channel such that, when the base element is coupled to the tongue element, the channel of the tongue element registers with the front channel and the back channel, and the selection pin is inserted through the first channel, the channel of the tongue element, and the back channel.

The channel of the base element may include an insertion aperture at a first end for inserting the selection pin, and a release aperture at a second end for inserting the locking pin of the third locking feature such that, when the locking pin is operated into the release aperture, the selection pin is at least partially removed from the channel.

The retractable safety latch may include a security pin. The security pin may include a pin head. The security pin may include a pin shaft configured to engage a locking element of the selection pin such that the selection pin is locked into a position at one of the multiple predetermined modes.

The first locking feature may include a selection fin. The second locking features may include multiple mode selection slots. Each of the multiple mode selection slot may correspond to one of the predetermined multiple modes, such that when the selection fin is registered to one of the multiple mode selection slots, the corresponding one of the predetermined multiple modes is selected.

The base element may be mounted on a mating surface by adhesive. The base element may be mounted on a mating surface by fasteners.

In an illustrative aspect retractable safety latch may include a tongue element having a hook with a substantially cylindrical cavity with a first radius (D1). The cylindrical cavity may be configured such that the hook releasably couples to a substantially cylindrical locking member with a second radius (D2) of a striker element. D1 may be less than D2 such that, to disengage the tongue element and the striker element, a force applied at the tongue element must exceed a predetermined disengagement force.

The retractable safety latch may include an elongated member coupling the hook to a body of the tongue element. The elongated member may extend parallel to the body of the tongue element. The elongated member may be configured such that, when the tongue element is selectively coupled to the striker element, the hook retains a predetermined margin of freedom against the cylindrical locking member to prevent failure of the tongue element.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A retractable safety latch, comprising:

a tongue element extending in a first plane, and a base element extending in a second plane, wherein the tongue element and the base element each comprises a channel extending along a hinge axis at an intersection of the first plane and the second plane;

a selection pin extending along a longitudinal axis; and a security pin comprising:

a pin head; and a pin shaft configured to traverse at least partially through a locking element of the selection pin, wherein:

when the selection pin is operated into the channels such that the hinge axis and the longitudinal axis are parallel, at least a first locking feature of the selection pin slidingly engages at least a second locking feature of the tongue element and a third locking feature of the base element having the selection pin being locked into a selected position such that the tongue element and the base element are selectively coupled in one of multiple predetermined modes, in an active mode of the multiple predetermined modes, the first plane and the second plane intersect such that the tongue element extends away from the base element to releasably engage a striker element, and in a stowage mode of the multiple predetermined modes, the first plane and the second plane are substantially parallel such that the tongue element does not engage the striker element.

2. The retractable safety latch of claim 1, wherein the tongue element comprises:

a hook having a substantially cylindrical cavity with a first radius (D1), wherein the cylindrical cavity is configured such that the hook releasably couples to a substantially cylindrical locking member of the striker element with a second radius (D2) of the striker element, wherein:

D1<D2 such that, to disengage the tongue element and the striker element, a force applied at the tongue element must exceed a predetermined disengagement force.

3. The retractable safety latch of claim 2, further comprising an elongated member coupling the hook to a body of the tongue element, wherein the elongated member extends parallel to the body of the tongue element and is configured such that, when the tongue element is selectively coupled to the striker element, the hook retains a margin of freedom against the cylindrical locking member to prevent failure of the tongue element.

4. The retractable safety latch of claim 1, wherein:

the base element further comprises a first base channel and a second base channel such that, when the base element is coupled to the tongue element, the channel of the tongue element registers with the first base channel and the second base channel, and the selection pin is inserted through the first base channel, the channel of the tongue element, and the second base channel.

5. The retractable safety latch of claim 1, wherein the channel of the base element comprises:

an insertion aperture at a first end for inserting the selection pin, and a release aperture at a second end for inserting the security pin such that, when the locking pin is operated into the release aperture, the selection pin is at least partially removed from the channel.

6. The retractable safety latch of claim 1, wherein:

the first locking feature comprises a selection fin, and the second locking features comprises multiple mode selection slots, each of the multiple mode selection slots corresponding to one of the predetermined multiple modes, such that when the selection fin is registered into one of the multiple mode selection slots, the corresponding one of the predetermined multiple modes is selected.

7. The retractable safety latch of claim 1, wherein the base element is mounted on a mating surface by adhesive.

8. The retractable safety latch of claim 1, wherein the base element is mounted on a mating surface by fasteners.

9. A retractable safety latch, comprising:

a tongue element extending in a first plane, and a base element extending in a second plane, wherein the tongue element and the base element each comprises a channel extending along a hinge axis at an intersection of the first plane and the second plane;

a selection pin extending along a longitudinal axis; and, a security pin comprising a pin shaft configured to traverse at least partially through a locking element of the selection pin, wherein:

when the selection pin is operated into the channels such that the hinge axis and the longitudinal axis are parallel, at least a first locking feature of the selecting pin slidingly engages at least a second locking feature of the tongue element and a third locking feature of the base element such that the tongue element and the base element are selectively coupled in one of multiple predetermined modes, in an active mode of the multiple predetermined modes, the first plane and the second plane intersect such that the tongue element extends away from the base element to releasably engage a striker element, and in a stowage mode of the multiple predetermined modes, the first plane and the second plane are substantially parallel such that the tongue element does not engage the striker element.

10. The retractable safety latch of claim 9, wherein the tongue element comprises:

a hook having a substantially cylindrical cavity with a first radius (D1), wherein the cylindrical cavity is configured such that the hook releasably couples to a substantially cylindrical locking member of the striker element with a second radius (D2) of the striker element, wherein:

D1<D2 such that, to disengage the tongue element and the striker element, a force applied at the tongue element must exceed a predetermined disengagement force.

11. The retractable safety latch of claim 10, further comprising an elongated member coupling the hook to a body of the tongue element, wherein the elongated member extends substantially parallel to the body of the tongue element and is configured such that, when the tongue element is selectively coupled to the striker element, the hook retains a margin of freedom against the cylindrical locking member to prevent failure of the tongue element.

12. The retractable safety latch of claim 9, wherein the tongue element comprises:

a hook having a wall of a predetermined height extended orthogonally to the tongue element such that, in the active mode, to disengage the tongue member and the striker element, a force applied at the tongue element must displace the hook by at least the predetermined height.

13. The retractable safety latch of claim 9, wherein:

the base element further comprises a first base channel and a second base channel such that, when the base element is coupled to the tongue element, the channel of the tongue element registers with the first base channel and the second base channel, and the selection pin is inserted through the first base channel, the channel of the tongue element, and the second base channel.

14. The retractable safety latch of claim 13, wherein the channel of the base element comprises:

an insertion aperture at a first end for inserting the selection pin, and a release aperture at a second end for inserting the security pin such that, when the locking pin is operated into the release aperture, the selection pin is at least partially removed from the channel.

15. The retractable safety latch of claim 9, wherein:

the first locking feature comprises a selection fin, and the second locking features comprises multiple mode selection slots, each of the multiple mode selection slot corresponding to one of the predetermined multiple modes, such that when the selection fin is registered to one of the multiple mode selection slots, the corresponding one of the predetermined multiple modes is selected.

16. The retractable safety latch of claim 9, wherein the base element is mounted on a mating surface by adhesive.

17. The retractable safety latch of claim 9, wherein the base element is mounted on a mating surface by fasteners.

18. The retractable safety latch of claim 9, wherein at one end of the selection pin comprises a countersunk head, wherein the countersunk head is configured to provide a stop for the selection pin.

19. The retractable safety latch of claim 9, wherein the security pin further comprises an engagement surface coupled to the pin shaft, wherein the engagement surface comprises a surface contoured to rest flush with an outer surface of the selection pin when the pin shaft is installed traversing the selection pin.

20. The retractable safety latch of claim 9, wherein the security pin is configured to releasably couple the locking element of the selection pin.

21. The retractable safety latch of claim 9, wherein the pin shaft is configured to traverse through the locking element in a direction perpendicular to the selection pin.

22. The retractable safety latch of claim 9, wherein the selection pin comprises a pintle-brace and the locking element comprises a longitudinally extending shaft of a pintle-brace.

* * * * *